(12) United States Patent
Beadnell et al.

(10) Patent No.: US 8,504,755 B2
(45) Date of Patent: Aug. 6, 2013

(54) USB 3 BRIDGE WITH EMBEDDED HUB

(75) Inventors: Duncan Beadnell, Abingdon (GB); Neil Buxton, Berkshire (GB); Gary Calder, Hants (GB)

(73) Assignee: PLX Technology, Inc., Sunnyvale, CA (US)

( * ) Notice: Subject to any disclaimer, the term of this patent is extended or adjusted under 35 U.S.C. 154(b) by 533 days.

(21) Appl. No.: 12/716,584

(22) Filed: Mar. 3, 2010

(65) Prior Publication Data

US 2011/0219163 A1 Sep. 8, 2011

(51) Int. Cl.
*G06F 13/20* (2006.01)

(52) U.S. Cl.
USPC .......................................... 710/313; 710/315

(58) Field of Classification Search
USPC ................................................ 710/313, 315
See application file for complete search history.

(56) References Cited

U.S. PATENT DOCUMENTS

| 7,124,223 | B2 | 10/2006 | Pax | |
|---|---|---|---|---|
| 8,041,872 | B1 * | 10/2011 | Castleberry | 710/311 |
| 2003/0154340 | A1 * | 8/2003 | Bolt et al. | 710/305 |
| 2006/0251087 | A1 * | 11/2006 | Ng et al. | 370/401 |
| 2008/0155160 | A1 * | 6/2008 | McDaniel | 710/306 |
| 2010/0011137 | A1 * | 1/2010 | McGowan | 710/105 |
| 2011/0119686 | A1 * | 5/2011 | Chen | 719/326 |

* cited by examiner

*Primary Examiner* — Nimesh G Patel
(74) *Attorney, Agent, or Firm* — Beyer Law Group LLP

(57) ABSTRACT

A bridge device for connecting a USB 3 host device with a plurality of downstream, non-USB 3 mass storage devices, such as SATA or PATA devices. The bridge device comprises an embedded hub having a plurality of internal USB 3 devices. The internal USB 3 devices do not have a physical USB 3 interface. The bridge device also has at least one downstream physical non-USB 3 device, to which a mass storage device may be attached. The internal USB 3 devices enable the host device to be presented with a plurality of USB 3 devices. This, in turn, allows transfer to the plurality of downstream physical non-USB 3 devices, via the internal USB 3 devices at an increased rate. The bridge may also include a downstream physical USB 3 interface. This can allow multiple bridge devices to be connected together in a cascade.

29 Claims, 12 Drawing Sheets

USB 3 BRIDGE WITH EMBEDDED HUB

BACKGROUND OF THE INVENTION (1) Field of the Invention

The present invention relates to a bridge for data transfer between a USB 3 interface of a host device and a data storage device having an interface in accordance with a data storage standard. The invention is concerned with improving the data transfer rate between the host device and multiple data storage devices.

(2) Description of Related Art

A storage device such as a hard disk drive is typically provided with a standard interface, for example a Parallel Advanced Technology Attachment (PATA) interface, a Serial Advanced Technology Attachment (SATA) interface, or a Small Computer System Interface (SCSI). The standard interface comprises a standard physical interface designed for connecting to a corresponding standard physical interface within a host computer. Controller electronics may be located, for example, on the motherboard or as an additional plug-in adapter.

In such an arrangement, in which the standard physical interface of a storage device is connected to a corresponding standard physical interface within a host computer, the host computer communicates with the storage device via the physical interface using a protocol for commands to transfer data and status information between the host and the storage device.

In the case of PATA and SATA, the standards defining the protocol are ATA/ATAPI standards, which are available from ANSI or techstreet, as listed at the website address: http://www.incits.org/list_INCITS.htm. Relevant standards include: INCITS 361: 2002 (Information Technology—AT Attachment with Packet Interface—6, ATA/ATAPI-6); INCITS 317: 1998 [R2008] (AT Attachment+Packet Interface, ATA/ATAPI-4) [T13 ]; and INCITS 317: 1998 Erratum 1: 1999[ ] (Erratum to INCITS 317: 1998, AT Attachment+Packet Interface, ATA/ATAPI-4) [T13].

For SCSI, the relevant standards are available from the ANSI or INCITS standards store, as listed at the website address: http://www.t10.org/pubs.htm. Relevant standards include: Reduced Block Commands (RBC) (INCITS 330-2000 [R2006]); Reduced Block Commands (RBC) Amendment 1 (INCITS 330-2000/AM1-2003); SCSI Block Commands—2 (SBC-2) (INCITS 405-2005); and SCSI Primary Commands—3 (SPC-3) (INCITS 408-2005).

However, in order to connect a storage device (such as a PATA or SATA standard disk drive) to a host computer with the drive located external to the host computer, an alternative interface has traditionally been used. A reason for this is that, until the eSATA specification was introduced in 2004, no practical means existed to extend the physical PATA or SATA cabling beyond the confines of the host enclosure. The choice of alternative interfaces includes those defined by the IEEE 1394 or Universal Serial Bus (USB) standards. Interfaces defined by both of these standards are typically universally available on host computers. The present invention concerns, in particular, the use of interfaces defined by the USB standard (which may be simply referred to as USB interfaces).

The USB standards are freely available. For example, they may be obtained from the website address http://www.usb.org. The USB 2 standard is available in the Universal Serial Bus Standards revision 2.0, Apr. 27, 2000, which can be found at http://www.usb.org/developers/docs. The USB 3 (including USB 3.0) standard is available as Universal Serial Bus 3.0 Specification, revision 1.0, Nov. 12 2008, which can also be found at http://www.usb.org/developers/docs.

In order to connect a USB interface of a host computer with a different interface of a storage device, a bridge device is required. This is because the physical layer technology (including the physical interfaces) and higher layer protocol standards are different between the USB protocol and the protocol used by the mass storage device. The PATA and/or SATA standard may be used herein to represent the protocol used by the mass storage device, but it will be understood that the mass storage device could use any other suitable protocol.

The bridge device must be capable of acting as a bridge between the USB interface (which includes a physical port) of the host computer and the PATA or SATA interface (which also includes a physical port) of the storage device. Thus the bridge must provide a USB interface for connecting to the USB interface on the host computer and also a PATA or SATA interface for connecting to the PATA or SATA interface of the storage device. The bridge is configured to translate the protocols used to carry the commands and data between the USB host and the bridge (i.e. the USB protocol defined by the USB standard), and between the bridge and the storage device (eg the PATA/SATA protocol defined by the ATA/ATAPI-6 standard).

One aspect of the present invention relates to providing a bridge between a USB 3 interface and multiple downstream data storage interfaces.

Another aspect of the present invention relates to providing a bridge between a USB 3 interface and multiple downstream data storage interfaces, at least one of which is a USB 3 interface.

BRIEF SUMMARY OF THE INVENTION

According to a first aspect of the invention, there is provided a bridge device for connecting a host device to data-storage devices, the bridge device comprising:

an upstream USB 3 interface in accordance with the USB 3 standard for connecting the bridge device to a host device;

a USB core comprising at least two internal USB 3 devices that are configured to present themselves as separate devices for receipt of data packets in accordance with the USB Mass Storage Class Specification, each data packet comprising a USB 3 header and a data packet in accordance with the SCSI standard, the upstream USB 3 interface comprising an embedded hub configured to route data packets from the upstream USB 3 interface to respective ones of the internal USB 3 devices;

at least two downstream interfaces, each downstream interface being in accordance with a respective data storage standard for a databus having a mass storage device connected thereto; and a protocol converter configured to convert a data packet in accordance with the SCSI standard into a data packet in accordance with the respective data storage standard of the downstream interface to which the data packet is destined, each downstream interface being arranged to receive data packets that are in accordance with its respective data storage standard from at least one of the internal USB 3 devices via the protocol converter.

Further according to the first aspect of the invention, there is provided a method of providing data transfer between a USB 3 interface on a host device and multiple downstream devices comprising:

providing a bridge device having:

an upstream USB 3 interface in accordance with the USB 3 standard for connecting the bridge device to a host device, the upstream USB 3 interface comprising an embedded hub;

a USB core comprising at least two internal USB 3 devices that are configured to present themselves as separate devices for receipt of data packets in accordance with the USB Mass Storage Class Specification, each data packet comprising a USB 3 header and a data packet in accordance with the SCSI standard; and at least two downstream interfaces, each downstream interface being in accordance with a respective data storage standard for a databus having a mass storage device connected thereto, and arranged to receive data packets from at least one of the internal USB 3 devices;

routing data packets using the embedded hub from the upstream USB 3 interface to respective ones of the internal USB 3 devices; and transferring data packets from each internal USB 3 device to at least one downstream interface, wherein the transferring step comprises converting a data packet in accordance with the SCSI standard into a data packet in accordance with the respective data storage standard of the downstream interface to which the data packet is destined.

According to the above method and bridge device multiple downstream data storage device-s can be connected to a single host USB 3 interface. This is possible without the USB 3 host interface causing a bottleneck for (or reducing the rate of) data transfer, because the USB 3 signaling rate is 5 Gbps, whereas the maximum throughout of a typical data storage device such as a SATA disk drive is only about 150 MB/s (or 1.2 Gbps). Thus, the present invention allows the 5 Gbps signaling rate of USB 3 to be utilised to support several downstream data storage devices.

By having an embedded hub, a host can make multiple commands simultaneously. This provides greater flexibility. For example the host can take increased control over which downstream storage device data is intended for. Thus, the use of JBOD/RAID processing outside the host device can be reduced. The result is that the host may be able to use more and/or different data storage modes/schemes, and/or may have better integration with operating system data storage systems.

Furthermore, because the embedded (USB) hub of the present invention resides within the USB Core of the bridge device, there is no requirement for an external device with a power supply. The present invention also obviates the need to provide multiple physical USB interfaces on the external storage device because the internal USB devices also reside within the bridge device itself, and thus have no physical interfaces. Furthermore, the internal USB 3 devices need offer no USB 2.0 hub functionality, because they do not require USB 3 physical interfaces, which must offer USB 2.0 compatibility according to the USB3 standard. This is advantageous because it lowers the cost and simplifies the design compared with using an external hub which routed data to multiple physical USB 3 devices.

Each downstream interface may be arranged to receive data packets from a respective internal USB 3 device. This can simplify the structure of the bridge device, because less processing may be required to determine which downstream interface data should be sent to from the internal USB 3 devices.

The number of downstream interfaces may be equal to the number of internal USB 3 devices. In this case, there may be a one-to-one mapping between the downstream interfaces and the internal USB 3 devices. Thus, the memory control requirements of the bridge device can be further simplified.

Alternatively, the number of downstream interfaces may be greater than the number of internal USB 3 devices. The bridge device may further comprise a memory controller arranged to receive data packets from a respective one of the internal USB 3 devices via the protocol converter and to control storage of the in the data packets onto data storage devices connected to a set of the downstream interfaces. The memory controller may be a RAID or JBOD memory controller. According to this aspect of the invention, the advantages of redundant storage that are associated with such memory controllers are provided by the present invention.

The respective data storage standard may be an ATA/ATAPI-6 standard. This enables the downstream interfaces to be used with SATA and/or PATA downstream storage devices. However, in general, the invention is equally applicable to other data storage standards, for example the SCSI Standard, or a flash memory standard. A flash memory standard includes any interface and command protocol that may be used in flash memory, for example the Open NAND Flash Interface V2.2. This standard is available at http://onfi.org/specifications/.

The protocol converter may be additionally configured to convert USB 3 packets to the SCSI standard before converting from the SCSI standard to the respective data storage standard. Thus, the protocol converter may be configured to receive data packets in accordance with the USB Mass Storage Class Specification, and to process the data packets so as to become in accordance with the respective data storage standard. For example, the protocol converter may be configured to strip the USB 3 header from the data packets in accordance with the USB Mass Storage Class Specification so as to produce the data packets in the SCSI Standard.

Alternatively, the USB core may be configured to convert the USB data packets, such that the packets received by the protocol converter are in accordance with the SCSI protocol. For example, the USB core may be configured to strip the USB 3 header from the data packets in accordance with the USB Mass Storage Class Specification before the data packets are routed to the protocol connector.

Each downstream interface may be in accordance with the same data storage standard. This may result in a simplified apparatus. For example the protocol converter may only then be required to translate to one data storage standard.

Conversely, not all of the downstream interfaces need be in accordance with the same data storage standard. In that case, the protocol converter may be configured to convert to a different data storage protocol depending on the data storage protocol of the downstream interface to which the data packet is destined. This can allow extra flexibility, for example with regard to the type of data storage device that can be connected to the downstream interface.

Further according to the first aspect of the invention, there is provided a storage unit for attachment to a host device, the data storage unit comprising a bridge device in accordance with the first aspect of the invention; and connected to each of the downstream interfaces of the bridge device, a databus in accordance with the respective data storage standard, each databus having a mass storage device connected thereto.

This provides a complete data storage unit that can be presented directly to a host in order to provide data storage, and that has the advantages of the bridge device described herein.

According to a second aspect of the invention, there is provided a bridge device for connecting a host device to data-storage devices, the bridge device comprising:

an upstream USB 3 interface in accordance with the USB 3 standard for connecting the bridge device to a host device;

a USB core comprising at least one internal USB 3 device that is configured to present itself as a device for receipt of data packets in accordance with the USB Mass Storage Class Specification, each data packet comprising a USB 3 header and a data packet in accordance with the SCSI standard;

a downstream USB 3 interface in accordance with the USB 3 standard for connecting the bridge device to a downstream USB 3 device, the upstream USB 3 interface comprising an embedded hub configured to route data packets from the upstream USB 3 interface to an internal USB 3 device or the downstream USB 3 interface;

at least one further downstream interface, the or each further downstream interface being in accordance with a respective data storage standard for a databus having a mass storage device connected thereto; and a protocol converter configured to convert a data packet in accordance with the SCSI standard into a data packet in accordance with the respective data storage standard of the further downstream interface to which the data packet is destined, the or each further downstream interface being arranged to receive data packets that are in accordance with its respective data storage standard from an internal USB 3 device via the protocol converter.

Further according to the second aspect of the invention, there is provided a method of providing data transfer between a USB 3 interface on a host device and multiple downstream devices comprising:

providing a bridge device having:
an upstream USB 3 interface in accordance with the USB 3 standard for connecting the bridge device to a host device, the upstream USB 3 interface comprising an embedded hub;
a USB core comprising at least one internal USB 3 device that is configured to present itself as a device for receipt of data packets in accordance with the USB Mass Storage Class Specification, each data packet comprising a USB 3 header and a data packet in accordance with the SCSI standard;
a downstream USB 3 interface in accordance with the USB 3 standard; and
at least one further downstream interface, the or each further downstream interface being in accordance with a respective data storage standard for a databus having a mass storage device connected thereto;

routing data packets using the embedded hub from the upstream USB 3 interface to an internal USB 3 device or the downstream USB 3 interface; and transferring data from each internal USB 3 device to at least one said further downstream interface, wherein the transferring step comprises converting a data packet in accordance with the SCSI standard into a data packet in accordance with the respective data storage standard of the further downstream interface to which the data packet is destined.

This aspect of the invention uses an embedded hub to provide a flexible bridge device. The bridge device allows another USB 3 device to be connected to it, as well as a mass storage device. The other USB 3 device that is connected to it may any type of USB 3 device, for example another bridge device of the same type, or a peripheral device, such as a USB 3 mouse or a USB 3 keyboard.

The bridge device according to the second aspect of the invention can thus operate in a variety of modes, including as a USB 3 to single mass storage device bridge, and a USB 3 to multiple mass storage device bridge.

The bridge device may further comprise:
a USB 3 downstream connection circuit configured to detect whether or not a device is connected to the downstream USB 3 interface, and
a USB 3 hub bypass circuit configured to bypass the embedded hub unit if the USB 3 connection circuit detects that no device is connected to the downstream USB 3 interface.

In the case that the USB core has only one internal USB 3 device, this enables the operation of the bridge device to be more efficient if the downstream USB 3 interface is not being used. This is because if there is only one internal USB 3 device, then there is no routing requirement, and so the embedded hub can be bypassed.

The bridge device may further comprise a memory controller within the embedded hub configured to control communication with mass storage devices attached to the bridge device via the downstream USB 3 interface. The memory controller may be a RAID or JBOD device.

According to an aspect, there is provided a cascade of bridge devices, each bridge device being of the type having a downstream USB 3 interface, the upstream USB 3 interface of each bridge device that is connected to an upstream bridge device being connected to the downstream USB 3 interface of an immediately upstream bridge device. This aspect of the invention allows any number of mass storage devices to be connected to a single host device that has a USB 3 interface by providing a cascade of bridge devices. At least one mass storage device can then be connected to each bridge device in the cascade.

According to an aspect, the most upstream bridge device in the cascade comprises a memory controller within the embedded hub configured to control communication with mass storage devices attached to the downstream USB 3 interface of the cascaded bridge devices. This enables the multiple storage devices connected to the bridge devices in the cascade to be presented to the host either as a multiple discs, or as a single logical device.

According to an aspect, there is provided a data storage unit for attachment to a host device, the data storage unit comprising a bridge device having a downstream USB 3 interface as described herein; and connected to each of the further downstream interfaces, a databus in accordance with the data storage standard, each databus having a mass storage device connected thereto. In this way, a complete data storage unit can be provided to the USB 3 interface of a host device, with the data storage unit providing a further downstream USB 3 interface that can be used to attach another USB 3 device.

Optionally, the USB core comprises at least two internal USB 3 devices that are configured to present themselves as separate devices for receipt of data packets in accordance with the USB Mass Storage Class Specification, the bridge device comprises at least two further downstream interfaces, each further downstream interface being in accordance with a respective data storage standard, each further downstream interface being arranged to receive data packets from at least one of the internal USB 3 devices via the protocol converter, and the embedded hub is configured to route data packets from the upstream USB 3 interface to respective ones of the internal USB 3 devices or the downstream USB 3 interface.

In this case, the bridge device and method in accordance with the second aspect of the invention is also in accordance with the first aspect of the invention because more than one internal USB 3 device is provided in the core, as well as the downstream USB 3 interface. Thus, the advantages discussed above in relation to the first aspect of the invention are also provided to embodiments that have a downstream USB 3 interface. In this case, the various further features, and their associated advantages, discussed above in relation to the first aspect of the invention are also applicable to the second aspect of the invention.

BRIEF DESCRIPTION OF THE DRAWINGS

FIG. 16 is a schematic diagram showing details of the fields in a transaction packet in USB 3; and FIG. 17 is a schematic diagram showing details of the fields in a data packet in USB 3.

DETAILED DESCRIPTION OF THE INVENTION

Embodiments of the present invention will now be described by way of non-limitative example with reference to the accompanying drawings.

Figure 1:
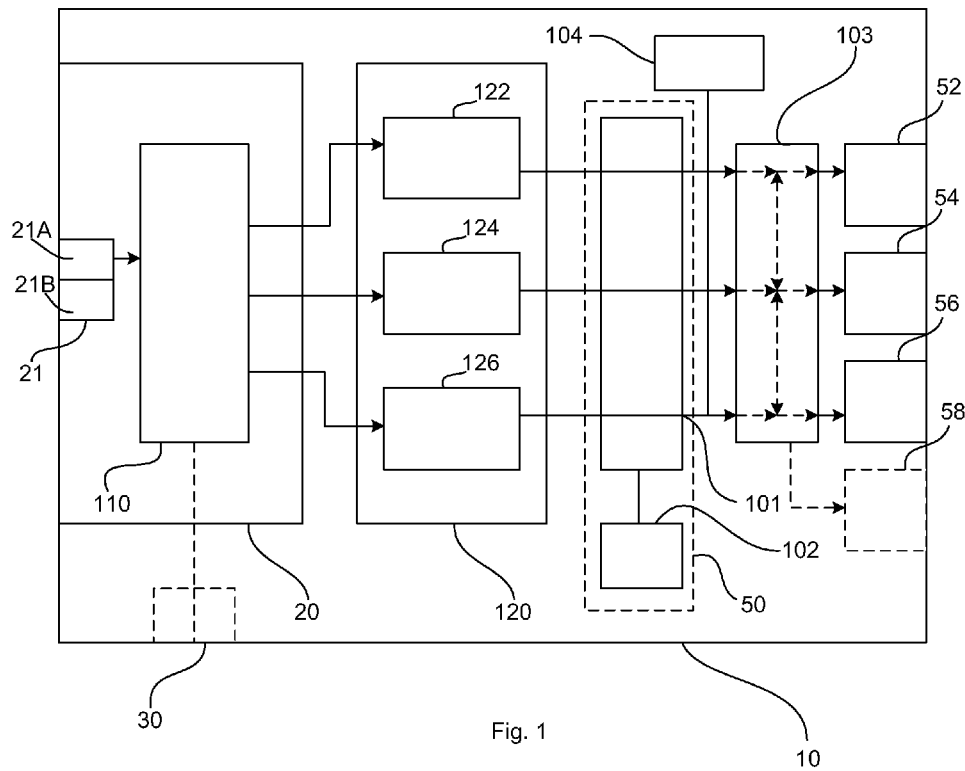
FIG. 1 is a diagram of a bridge device including an embedded hub and internal USB 3 devices.

FIG. 1 illustrates a bridge device 10 according to an embodiment of the invention. The bridge device 10 comprises an upstream USB 3 interface 20 for connection with a host, such as a host computer. The upstream USB 3 interface 20 comprises a physical USB 3 interface (or port) 21, and an embedded hub 110.

The upstream USB 3 interface 20 is in communication with a USB 3 core 120. The USB core 120 comprises a number of internal USB 3 devices 122, 124, 126. The internal USB 3 devices 122, 124, 126 need not have physical layers i.e. they need not have physical USB connectors. In the embodiment of FIG. 1, the USB core 120 has three internal USB 3 devices 122, 124, 126. However, alternative embodiments may have different numbers of internal USB 3 devices, as described in greater detail below.

The bridge device 10 shown in the embodiment of FIG. 1 also has a downstream USB 3 interface 30 in connection with the embedded hub 110. As will also be described below, some embodiments (in particular those in which there are two or more internal USB 3 devices in the USB 3 core 120) may not include a downstream USB 3 interface 30. Thus, the downstream USB interface 30 in FIG. 1 is shown with a dashed line, indicating that it is optional.

The bridge device 10 shown in the embodiment of FIG. 1 is configured such that, in operation, a data packet conforming to the USB 3 standard that is received via the upstream USB 3 interface 20 is routed by the embedded hub 110 either to one of the internal USB 3 devices 122, 124, 126, or to the downstream USB 3 interface 30 (if present). Similarly, outgoing USB 3 data (i.e. data to be transmitted out from the bridge device 10 to the host through the physical USB 3 interface 21) may be routed from each of the internal USB 3 devices 122, 124, 126 and/or the downstream USB 3 interface 30 to the upstream physical USB 3 interface 21 via the embedded hub 110. In all cases, the data packets remain in conformance with the USB 3 standard whilst being routed between the upstream physical USB 3 interface 21 and the internal USB 3 devices 122, 124, 126 and/or the downstream USB 3 interface 30. The details of how the data packets (which may include, for example, commands and/or payload) is communicated to, within, and from the upstream USB 3 interface 20 and the USB core 120 are explained herein.

The bridge device 10 shown in the embodiment of FIG. 1 also has at least one downstream interface 52, 54, 56. Each downstream interface 52, 54, 56 is in accordance with a respective data storage standard.

Each downstream interface 52, 54, 56 is for connecting the bridge device 10 to a data-storage device. Each downstream interface 52, 54, 56 is configured to transfer data packets to and/or from a data storage device using a protocol that does not conform to the USB 3 standard. For example, the protocol used to transfer data to/from downstream interface 52, 54, 56 may be in accordance with, or conform to, the protocol used for PATA, or SATA devices. Where the description herein relates to downstream interfaces 52, 54, 56 in accordance with the PATA and/or SATA protocol, it will be understood that any other protocol suitable for a mass storage device could be used. The respective data storage standard of each downstream interface 52, 54, 56 may be the same for each downstream interface 52, 54, 56. Alternatively, not all of the downstream interfaces 52, 54, 56 may be in accordance with the same data storage standard. Of course, optionally more than one additional downstream interface 58 may be provided.

In the example shown in FIG. 1, there are three downstream interfaces 52, 54, 56. However, different embodiments may have any number of downstream interfaces 52, 54, 56. Furthermore, the number of downstream interfaces 52, 54, 56 may correspond to the number of internal USB 3 devices 122, 124, 126. Alternatively, the number of downstream interfaces

52, 54, 56 may be different to the number of internal USB 3 devices 122, 124, 126. In the example of FIG. 1, an additional downstream interface 58 is shown by dashed lines, indicating that its presence is optional.

In the bridge device 10 of FIG. 1 a protocol converter 50 is also provided. This protocol converter 50 is configured to convert data packets (which includes commands) to the protocol (e.g. PATA or SATA) conforming to the standard used by the downstream interfaces 52, 54, 56. The data packets exiting the internal USB 3 devices 122, 124, 126 may already have been converted from the USB protocol and thus be in the SCSI standard when entering the protocol converter 50. Thus, the protocol converter 50 may convert from the SCSI standard to the protocol (e.g. PATA or SATA) conforming to the standard used by the downstream interfaces 52, 54, 56. Alternatively, the data entering the protocol converter 50 may still be in the USB 3 standard. In that case, the protocol converter 50 may be configured to convert the data packets from the USB protocol to SCSI, then to convert the resulting SCSI standard data packets to the protocol (e.g. SATA or PATA) conforming to the standard used by the downstream interface 52, 54, 56 to which the data packet is destined. Thus, the protocol converter 50 is configured to convert data packets (including commands) from the SCSI standard to the protocol conforming to the respective standard used by the downstream interfaces 52, 54, 56 to which the data packet (or packets) is destined, but the conversion of the data packets (including commands) from the USB protocol to SCSI may either be performed upstream of, or alternatively within, the protocol converter 50. In embodiments in which the downstream interfaces 52, 54, 56 are all in accordance with a common data storage standard, the protocol converter 50 can convert all of the data packets to the protocol corresponding to the common data storage standard. In embodiments in which not all of the downstream interfaces 52, 54, 56 are all in accordance with a common data storage standard, the protocol converter can convert data packets into protocols corresponding to different data storage standards, depending on data storage standard of the destination downstream interface 52, 54, 56 of the data packet. Further details and features of the protocol converter 50 are described below.

The bridge device 10 of FIG. 1 also has a memory controller 103. The controller 103 is associated (i.e. is in communication with) at least one of the internal USB 3 devices 122, 124, 126. As described herein, the memory controller 103 controls how the data is stored between the downstream memory devices that may be attached to the bridge. As described herein, some embodiments may not include a memory controller 103. In some embodiments, there may be a separate memory controller associated with each internal USB 3 device 122, 124, 126.

Other features of FIG. 1 are described herein.

In order to better understand the operation of the present invention, a description will now be given of how data packets are communicated in a conventional USB 2.0 to SATA bridge device. Such devices are available in the prior art, see, for example U.S. Pat. No. 6,618,788. In this regard, reference is made to FIG. 2.

Figure 2:
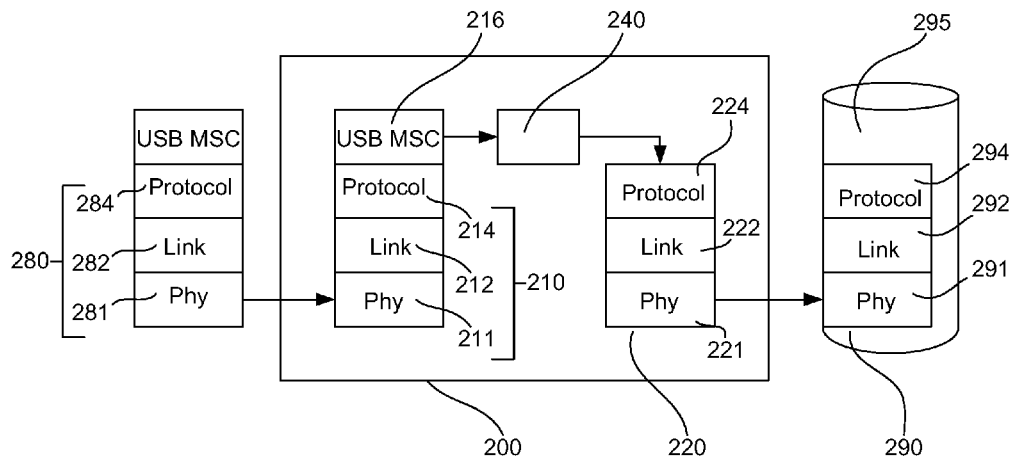
FIG. 2 is a diagram showing the layers in a conventional USB to mass storage device bridge device.

FIG. 2 shows a bridge device 200. The bridge device 200 is configured to provide a bridge between a USB 2.0 host interface 280 on a host device conforming to the USB 2.0 standard, and a SATA/PATA interface 290 of a storage device. The bridge device 200 of FIG. 2 has an upstream USB 2.0 interface 210 for connection with the USB host interface 280 on the host device, and a downstream interface 220 conforming to the ATA/ATAPI-6 standard for attachment to the SATA/PATA interface 290 of the storage device 295.

In FIG. 2, the interfaces 210, 220, 280, 290 have a section 211, 221, 281, 291 labeled "Phy". This is to indicate that they have a physical layer (i.e. a physical connector) complying with the relevant standard. The relevant standard also defines a link layer, and a protocol layer, as shown in FIG. 2. Thus, the link layer 282 and the protocol layer 284 associated with the USB host interface 280 conform to the USB 2.0 standard, and the link layer 212 and the protocol layer 214 associated with the upstream USB interface 210 of the bridge device also conform to the USB 2.0 standard. On the other hand, the link layer 292 and the protocol layer 294 associated with the SATA/PATA interface 290 of the storage device 295 conform to the ATA/ATAPI-6 standard, and the link layer 222 and the protocol layer 224 associated with downstream interface 220 of the bridge device 200 conform to the same (ATA/ATAPI-6) standard.

In this way, the bridge device 200 can present itself to the USB host interface 280 as a USB device. Furthermore, the USB standard allows a specific type of device to be defined through higher-level protocols. In the case of a bridge device 200, it is desirable to present a USB mass storage device to the USB host interface 280, and so the USB Mass Storage Class Specification (USB MSC) 216 is used at the upstream USB interface 210 end of the bridge device 200. The relevant Mass Storage Class Specifications are freely available. Relevant specifications include: USB Mass Storage Class Specification Overview Revision 1.3, Sep. 5, 2008 (available, for example, at the website address http://www.usb.org/developers/devclass_docs/usb-msc-overview-1.3b.pdf); USB Mass Storage Class Bulk Only Transport Revision 1.0, Sep. 31, 1999 (available, for example, at the website address http://www.usb.org/developers/devclass_docs/usbmassbulk_10.pdf); and USB Attached SCSI Protocol Revision 1.0, Jun. 24, 2009 (available for example at the website address http://www.usb.org/developers/devclass_docs/uasp_1_0.zip)

As such, the physical layer 211, link layer 212, protocol layer 214, and USB MSC specification layer 216 are provided at the upstream end of the bridge device 200 so that the bridge device 200 presents itself to the USB host interface 280 as a USB mass storage device. In this way, the physical storage device attached to the downstream interface 220 of the bridge device 200 can be any type of storage device, operating in accordance with any standard, with the bridge device 200 acting on its behalf in communication with the host as a USB mass storage device. Thus, the communication between the USB host device and the bridge device 200 is the same as the communication between a USB host device and a USB mass storage device. Translation between the (SCSI based) Reduced Block Commands (RBC) data, and status carried in the Command Block Wrapper (CBW), Command Status Wrapper (CSW) and data of the Mass Storage Class (MSC), and the ATA or PATA protocol of the downstream interface 220 is performed by a protocol converter 240. This protocol converter 240 may be similar in function and operation to the protocol converter described herein in relation to, for example, FIG. 1. This communication and translation is described below.

The attachment of the class of mass storage devices over a USB interface is covered by the USB Mass Storage Class specification, as indicated above. The USB Mass Storage Class Specification describes that the command set supported by the USB mass storage device is indicated by the bInterfaceSubClass field of the Interface Descriptor of the mass storage device. The Interface Descriptor is part of a hierarchy of descriptors which describe to the host information such as what the device is, who makes it, what version of USB it supports, how many ways it can be configured, and the number of endpoints and their types.

Mass storage USB devices (or hard-disk based mass storage USB devices), which is the type of device presented to the USB host interface 280 of a host device by the bridge device 200, use the code 01h in this field. This code means the device uses the command set defined in the Reduced Block Commands (RBC) standard developed by ANSI-INCITS T.10 group. The RBC standard defines a minimal command set for logical block addressable storage devices, such as hard disks. Thus, the RBC command set is used for communication between the host and the bridge device 200.

The commands themselves are carried within the transport protocol, indicated by the bInterfaceProtocolField of the Interface Descriptor of the mass storage device. With hard disk mass storage USB devices, a value of 50 h is used to indicate that the USB Bulk Only Transport (BOT) protocol (defined in the USB Mass Storage Class Bulk Only Transport specification) is used.

Alternatively, an Interface Descriptor value of 62 h is used to indicate that the USB Attached SCSI transport protocol (defined in the USB Mass Storage Class USB Attached SCSI Protocol (UASP) specification) is used.

In the Bulk Only Transport and USB Attached SCSI protocols, RBC Commands and data packets sent to the mass storage device are directed to the Bulk Out endpoint of the USB mass storage device and the RBC Status and data being sent from the mass storage device are sent from the Bulk In endpoint of the USB mass storage device.

Every command sent to a USB mass storage device is completed by the device returning a status, with the data transfer phase (which is optional, as not every command requires a data transfer phase) occurring between the command and status phases. The process by which the commands to read and write data are transferred from the host computer to an externally attached USB mass storage device can be summarized as follows:

1. The host computer issues RBC commands to a Mass Storage Class Driver associated with (for example located in) the host computer;
2. The Mass Storage Class Driver encapsulates the command in a Command Block Wrapper (CBW) (for BOT) or a Command Information Unit (CIU) (for UASP) and sends it through the USB driver stack (i.e. through the USB protocol, link, and physical layers associated with the host device, and the USB physical, link, and protocol layers associated with the USB mass storage device) to the Bulk Out endpoint of the USB mass storage device;
3. If the command requires data transfer, data is transferred through the USB driver stack to the Bulk Out endpoint of the USB mass storage device, or received from the USB mass storage device by the host via the USB driver stack and the Bulk In endpoint of the USB mass storage device;
4. The mass storage device responds with status in a Command Status Wrapper (CSW) (for BOT) or Sense Information Unit (SIU) (for UASP) which is received by the host from the USB mass storage device via the USB driver stack and the Bulk In endpoint of the USB mass storage device.

It will be appreciated that the procedure outlined above for the data transfer between a USB host and a USB mass storage device applies to devices operating under either of the USB 2.0 and USB 3 standards. Similarly, the basic structure of bridge device 200 shown in FIG. 2 may be used with devices (i.e. host devices) operating under either of the USB 2.0 and USB 3 standards. The details of how the data and commands are transferred between a USB host port and a USB mass storage device (which, again, is how a bridge device, such as the bridge device 200 of FIG. 2 is presented to the USB host interface) is dependent on whether the transfer operated under the USB 2.0 standard or the USB 3 standard. The details of data transfer under USB 2.0 and USB 3.0 are given below.

Figure 3:
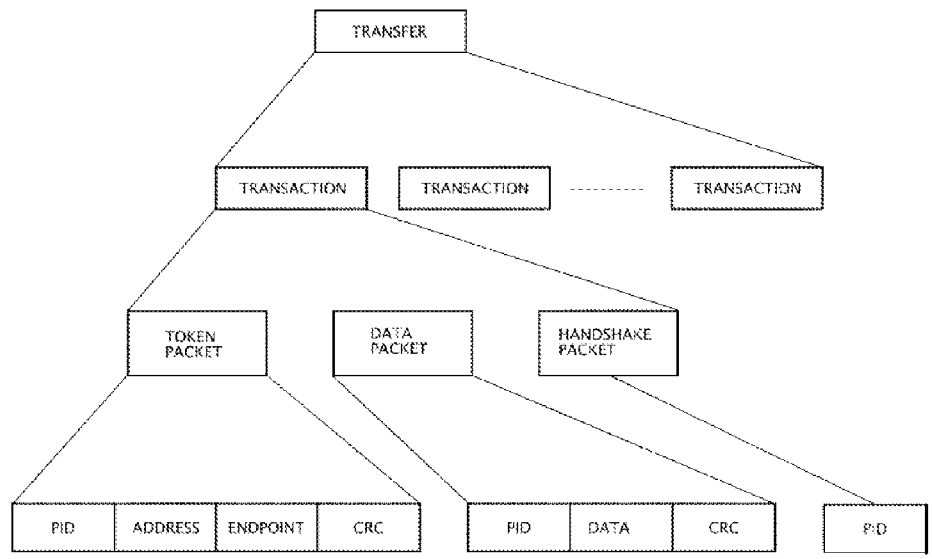
FIG. 3 is a schematic diagram showing transaction packet layering for a USB 2 device.

At the USB level, for both USB 2.0 and USB 3, the transfer of the CBWs and CIUs, the data (in the form of packets) to be transferred, or the CSWs and SIUs all take place as one or more USB transactions. FIG. 3 shows a schematic of data transfer transactions for the USB 2.0 case. For Bulk type transfers, the transfer comprises plural transactions each taking place in 3 phases, Token, Data, and Handshake. The token packet comprises a packet identifier (PID in FIG. 3), address information indicating an intended address location of data in the corresponding data packet, an endpoint, and CRC information. The data packet comprises the packet identifier (PID), the payload (i.e. the data in FIG. 3), and CRC information. The Handshake packet comprises just the packet identifier (PID). With USB 2.0 the bus is a single pair of wires, so that the Token identifies, using the PID, whether the transaction is a data transfer to a Bulk Out endpoint or a transfer from a Bulk In endpoint. The PID for data packets is used for correct data sequencing. For the handshake packets, the PID identifies if the data was received correctly or not and whether the device can send/receive more data.

Figure 4:
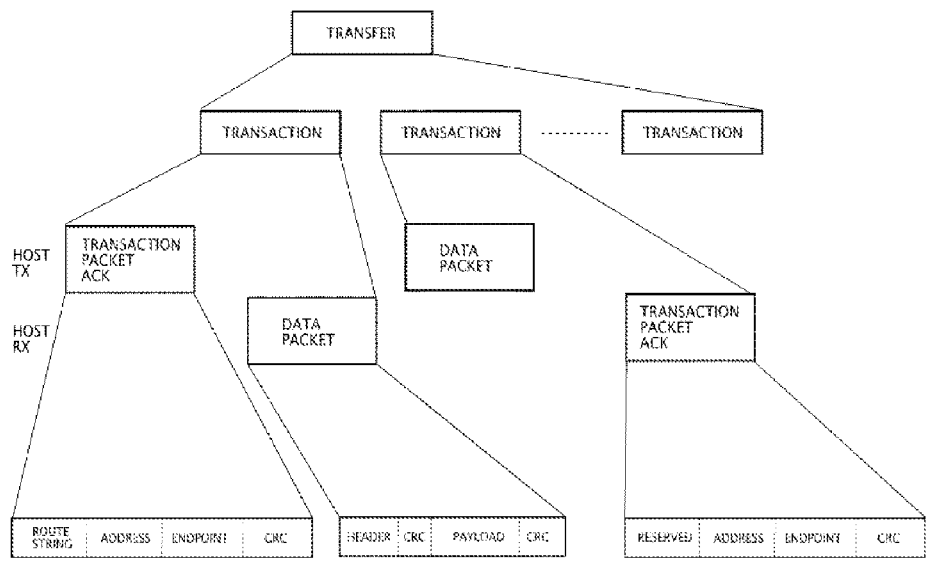
FIG. 4 is a schematic diagram showing transaction packet layering for a USB 3 device.

FIG. 4 shows a schematic of data transfer transactions for the USB 3.0 case. As will be appreciated, the present invention is mainly concerned with USB 3 in general, and in particular with USB 3.0. Parts of the description herein relate to the USB 3.0 standard. It will be understood, however, that the embodiments, and the invention, relate to USB 3 in general. USB 3.0 data transfer transactions are described below. With USB 3.0, there are 2 separate pairs of wires: one for data being sent to the host; and one for data being sent from the host. Typically, the outgoing, or transmit pair of wires may be called SSTX+ and SSTX− (meaning SuperSpeed Transmit positive and negative respectively), and the incoming, or receiving pair of wires may be called SSRX+ and SSRX− (meaning SuperSpeed Receive positive and negative respectively). This obviates the need for a token phase, because an ACK Transaction packet on the host's outgoing (or transmit) pair of wires (HOST TX in FIG. 4) implicitly means that data is being requested from the USB mass storage device. In this case, the USB mass storage device responds with data packets on its transmit pair, which is the receive pair (HOST RX) for the host. This is the case in the example shown on the left hand side in FIG. 4. Similarly, data packets sent on the HOST TX pair is data intended for the USB mass storage device, which is acknowledged using ACK transaction packets on the HOST RX pair. This is the case in the example shown on the right hand side in FIG. 4.

In USB 3.0 Super Speed mode, there are four basic packet types: transaction packets; data packets; link management packets; and isochronous timestamp packets. All of these packets consist of a 14 byte header and a 2 byte link control word. The type field, which occupies the first 5 bits of every packet, identifies the type of packet.

In FIG. 4, only transaction packets and data packets are shown. This is because of the four basic packet types, only transaction packets and data packets are used in the mass storage class specification protocol. Some of the fields of the acknowledgement transaction packets and data packets are also shown in FIG. 4. The fields shown in FIG. 4 are a simplification, and a more detailed version of the fields contained in an acknowledgement transaction packet and a data packet are shown in FIGS. 16 and 17 respectively.

Figures 16, 17:
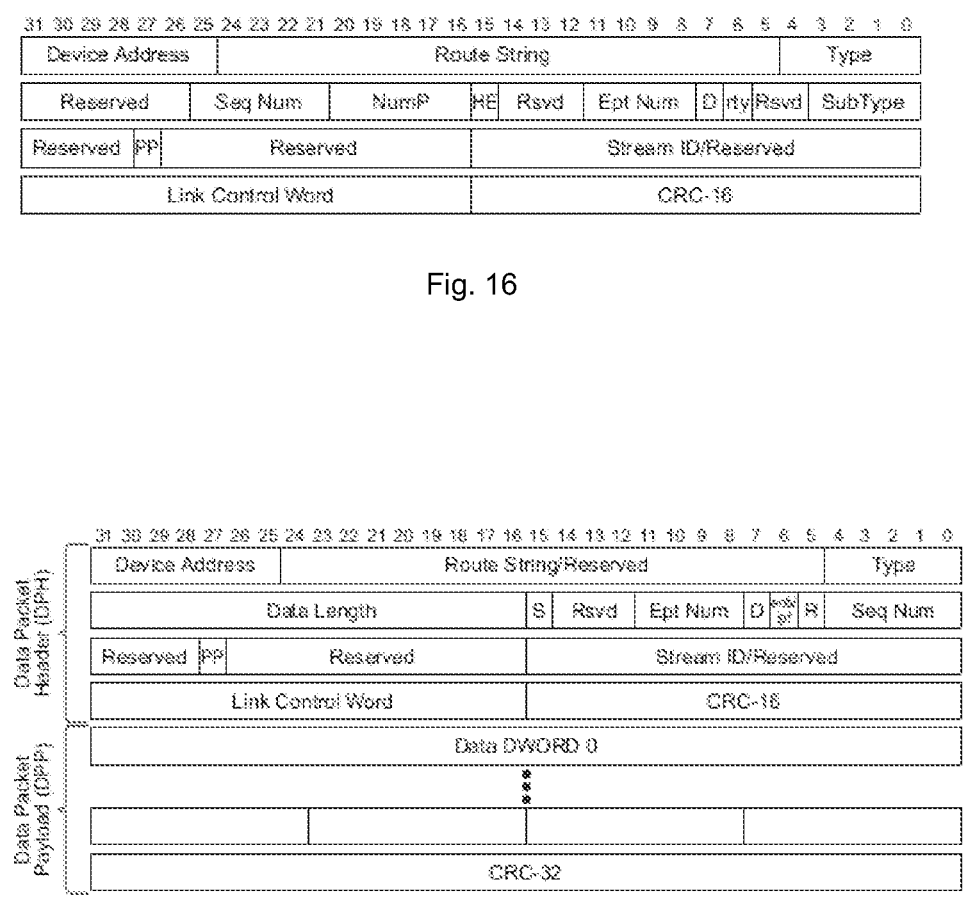

As can be seen in FIGS. 16 and 17, the data packets and transaction packets have several common fields. Both the transaction packets and the data packets have a Route String field, which is shown in FIGS. 16 and 17 as being a 20 bit Route String field. For packets which travel in the host to device direction (which includes all transaction packets) the Route String field is used, for example by hubs, to route packets from the upstream interface (or port) to the correct downstream interface (or port). For packets which travel in the device to host direction (which includes some data packets), the Route String field is reserved (as shown in the bottom left hand corner of FIG. 4) and is set to have the value 0.

For transaction packets, as shown in FIG. 16, there is also a 4 bit Sub Type field. For acknowledgement transaction packets, such as those shown in FIG. 4, this field is set to the value 0001B. Both the data packet and the transaction packet also contain an Ept Num field, which indicates the end point of the device (which, as explained above, is indicated by the device address field) that the packet is intended for or came from.

Every data packet and transaction packet also has a Device Address field, which is shown in FIGS. 16 and 17 as being a 7 byte device address field. For packets which travel in the host to device direction (which includes all transaction packets), this field is set by the host to be intended recipient of the packets. For packets which travel in the device to host direction, this field is set by the device to have its own address, because the intended recipient is always the single host in the system. The host may then use the device address used in the device address field to determine the source of the packet.

In the simplified version of FIG. 4, it will be appreciated that the header information of the data packet includes the Type, Route String, Device and Ept Num fields, amongst others.

Figure 5:
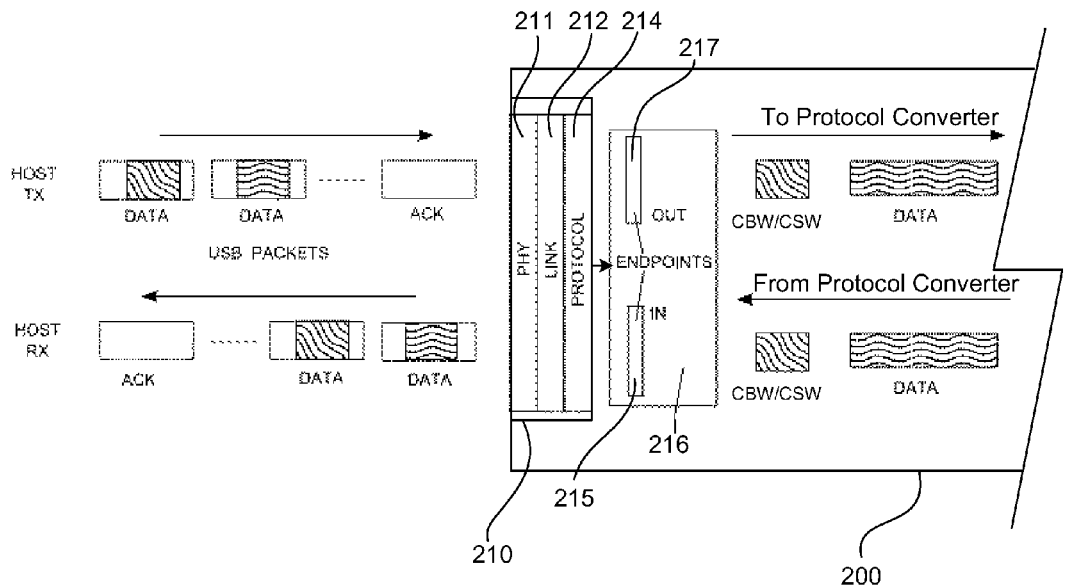
FIG. 5 is a diagram showing data packetisation for a USB 3 device.

A detailed view of data transfer in a bridge device (which may be similar to the bridge device 200 of FIG. 2) is shown in FIG. 5 for the case where the USB 3.0 standard is used, rather than the USB 2.0 standard. In FIG. 5, the USB MSC specification layer 216 is shown in greater detail. In particular, the mass storage device Bulk Out endpoint 217 and the mass storage device Bulk In endpoint 215 are shown. As described above in relation to USB data transfer between a USB host and a physical USB mass storage device, the Bulk Out endpoint of the upstream USB 3.0 interface 210 accepts the incoming USB packets and re-constitutes the CBW (and data if this transfer is to the device). The Bulk In endpoint takes the data (if this transfer is to the host) and CSW and packetizes them for transfer to the host.

The data packets and CBWs/CSWs are received by and sent from the Bulk Out and Bulk In endpoints respectively, which conform to the USB Mass Storage Class Specification. As stated above, the purpose of the bridge device 200 is to allow a USB host interface 280 on a host device conforming to the USB standard (USB 3.0, in this example), to communicate with an interface 290 conforming to a mass storage standard (for example a SATA/PATA interface). Thus, a processing unit 240/50 is required to convert the data conforming to the USB Mass Storage Class Specification handled by the Bulk In and Bulk Out endpoints, to/from the data conforming to the other standard (for example the ATA/ATAPI-6 standard to which PATA/SATA devices conform) used by the downstream interface 220. The processing unit 240/50 may comprise, or may alternatively be referred to as a protocol converter 240/50.

Figure 6:
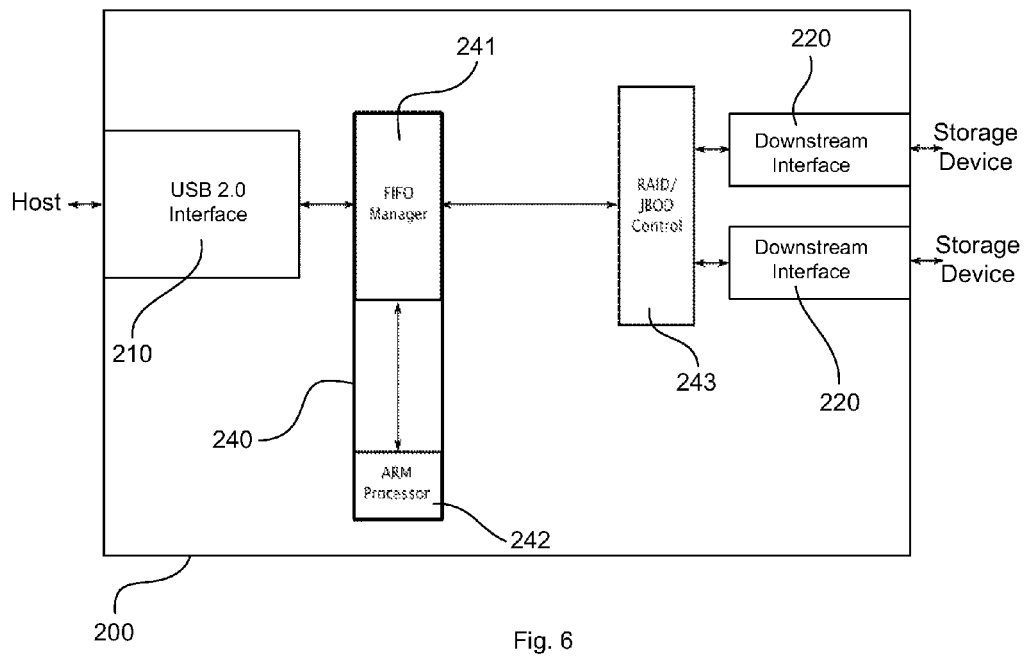
FIG. 6 shows a diagram of a bridge device for bridging between a USB 2 host and a data storage device.

FIG. 6 shows a schematic of a conventional USB 2.0 bridge device 200 such as that shown in FIG. 2. The FIG. 6 device is an example of a conventional bridge device that may be used between USB 2.0 and SATA interfaces. Thus, the device of FIG. 6 as a whole is not in accordance with the invention, but is used to assist understanding of the invention. In the schematic of FIG. 6, the upstream USB 2.0 interface 210 comprises the USB 2.0 physical interface 211, link layer 212, protocol layer 214, and the USB MSC specification layer 216 (including the Bulk In 215 and Bulk Out 217 endpoints) shown in FIG. 2. The USB 2.0 interface 210 is further configured to receive the encapsulated RBC commands in a CBW and unpack these commands and associated parameters. The data is then passed to the processing unit 240. The processing unit 240, or protocol converter 240, is configured to convert, or reformat, the data as described below.

The data received by the protocol converter 240 is buffered in a FIFO/Queue manager 241 that operates under the control of a processor 242 (which may be an ARM processor). The processor 242 is configured to perform the re-formatting of the commands into the appropriate format for the physical storage device (for example PATA or SATA). The reformatted commands and/or data may then be sent to the downstream interface 220, and subsequently passed to the attached mass storage device. In the example of FIG. 6, the attached mass storage device would be a SATA device, because the downstream interface 220 is a SATA interface. However, it will be appreciated that any suitable mass storage device could be attached using a suitable downstream interface 220.

The FIFO/Queue manager 241 also controls the movement of data to/from the endpoint buffers and the upstream USB 2.0 interface 210. For optimum speed of operation of data transfer, this movement is usually conducted through hardware, although an escape mechanism may be provided for the data path to travel through firmware, whereby the control processor 242 can access the FIFO/Queue buffers directly. This may be, for example, to selectively modify commands, status and data packets being passed between the upstream USB 2.0 interface 210 and the downstream interface 220.

The attached mass storage device may consist of multiple hard drive units. In that case, the USB 2.0 interface 210 may be configured to present these units to the host device either as a single LUN (Logical Unit Number) or as multiple LUNs. If they are presented as multiple LUNs, the host identifies which LUN a command is being sent to by use of the bCBWLUN field in the CBW. The FIFO/Queue manager 241 uses this field to ensure the re-formatted command is addressed to the appropriate physical device.

There may be more than one downstream interface 220 provided by the bridge device 200. In the bridge device 200 of FIG. 6, for example, there are two downstream interfaces 220. In the case of having more than one downstream interface 220, the bridge device 200 may also include a memory controller, such as a RAID or JBOD controller 243. Such a controller 243 enables the multiple mass storage devices to be arranged as a RAID or JBOD array. The controller 243 may be located in the data path, as shown in FIG. 6, to handle the transfer of data to/from the array of mass storage devices. This can involve multiple read/write transfers of portions of the data according to the particular RAID or JBOD arrangement, and/or the amalgamation of several status reports into a single status report.

The above description in relation to FIGS. 2, 5 and 6 relates to a bridge device 200 which has a single USB data input/output stream to/from the USB interface 210.

Such an arrangement is conventional in the prior art in relation to bridges for use with USB 2.0 devices. In this regard, the USB 2.0 interface has a maximum s/b signaling rate of 480 Mbps. This is barely sufficient to support the maximum data transfer rate of a single PATA or SATA drive, and so would be incapable of supporting data transfer to more than one SATA or PATA device simultaneously without becoming a bottleneck.

However, with USB 3, the signaling rate is increased to 5 Gbps. USB 3 is therefore capable of supporting multiple USB mass storage devices operating at the maximum data transfer rates of the attached physical storage devices, such as PATA or SATA mass storage devices. As such, there is an advantage to having more than one instance of internal USB mass storage device implemented within the bridge. Each internal USB mass storage device can then support, or communicate with, at least one physical mass storage device attached to the downstream side of the bridge device. Thus, the embodiment of the invention described above in relation to FIG. 1, has multiple internal USB 3 devices 122, 124, 126 (which may be considered to be internal USB 3 mass storage devices 122, 124, 126, or virtual USB 3 devices 122, 124, 126) in a USB 3 core 120. As will be appreciated from the description below, the internal USB 3 devices 122, 124, 126 do not each require a dedicated link layer and physical layer. Instead, the USB 3 packets can be routed directly to the protocol layer and thence to the USB 3 mass storage class instance (i.e. the internal USB 3 device) directly. In this way, the internal USB 3 devices can present themselves as USB 3 devices, but without the need for physical connectors.

An explanation of the bridge device 10 shown in FIG. 1 is given below in greater detail.

As described above, the bridge device 10 shown in FIG. 1 has an upstream USB 3 interface 20. According to the USB 3 standard, a USB 3 interface must be compatible with both USB 2.0 and USB 3 devices. Thus, as shown in FIG. 1, the upstream USB 3 interface 20 comprises a USB 3 physical interface 21 with both USB 3 connectors 21A and USB 2.0 connectors 21B. If a USB 3 host interface is connected to the USB 3 physical interface 21, then the data transfer then proceeds through the embedded hub 110 and the USB core 120 as described below.

The embedded hub 110 acts as a packet router. The embedded hub 110 is configured to route USB 3 packets based upon information contained in the RouteString field in the packet header received from the host device. As described above in relation to FIGS. 4, 13 and 14, for USB 3 this RouteString field is contained in the acknowledgement transaction packet as well as the header of the data packet. This information indicates which of the internal USB devices 122, 124, 126 in the USB 3 core 120 the USB 3 packet is destined for. The USB 3 packets themselves are unchanged as they travel through the embedded hub 110 and USB 3 core 120. In the mass storage device to host direction, packets from downstream interfaces 52, 54, 56 are always routed to the single upstream USB 3 interface 20, so the RouteString is not used. The host can determine the source of the packet when it arrives by the Device Address field in the packet header.

Figure 7:
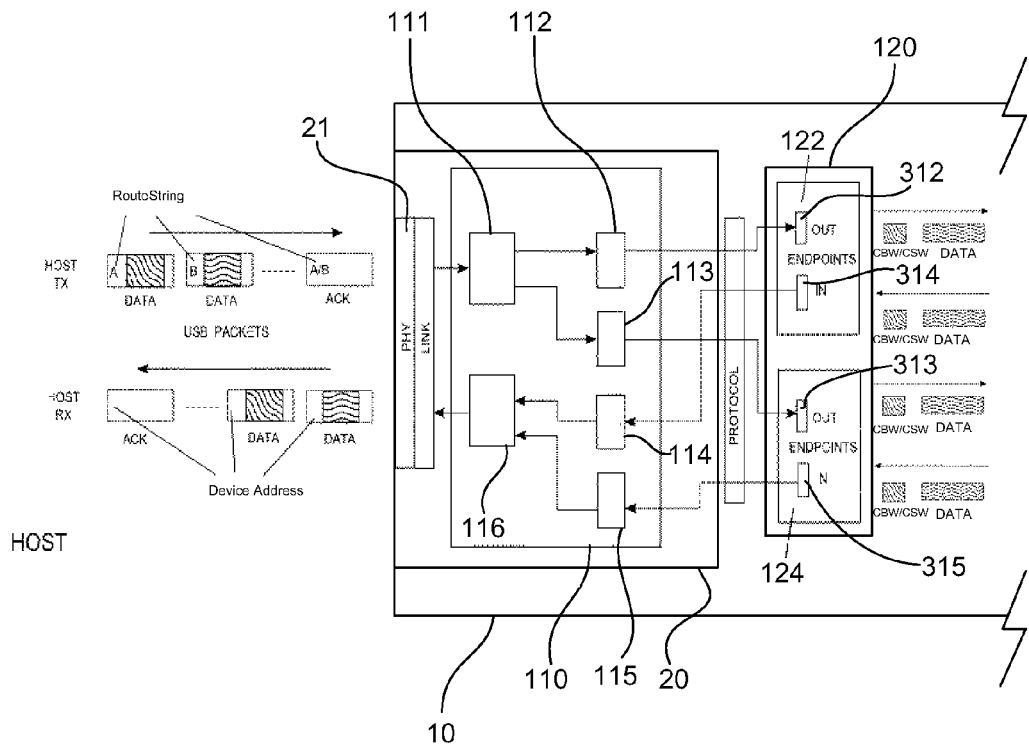
FIG. 7 is a diagram showing a bridge device with an embedded hub and a USB core having internal USB 3 devices.

FIG. 7 shows the operation of the embedded hub 110 and the USB 3 core 120 in the embodiment of FIG. 1 in greater detail. As shown in FIG. 7, USB 3 data may be received by the USB 3 interface 20 from a host device. The data includes information in the RouteString field indicating which internal USB 3 device the data is destined for. In the example shown in FIG. 7, just two internal USB 3 devices 122, 124 are present in the USB core 120. This is different to the embodiment shown in FIG. 1, which has three internal USB 3 devices 122, 124, 126. Embodiments can have any number of internal mass USB 3 devices present in the embedded hub, for example 1, 2, 3, 4, 5, 6, 7, 8, 9, 10, or more than 10 internal USB 3 devices.

In FIG. 7, the data received by the USB 3 physical interface 21 from the host device is passed to the embedded hub 110 via the USB 3 link layer. The embedded hub 110 operates to route the data (for example data packets) based on the information in the RouteString field. In the embodiment shown in FIG. 7, the embedded hub 110 comprises a routing device 111 which is configured to route the data to incoming packet buffers 112, 113. The number of incoming packet buffers 112, 113 is equal to the number of internal USB 3 devices 122, 124. Each incoming packet buffer 112, 113 is arranged to receive, and optionally hold, data that is destined for a corresponding internal USB 3 device 122, 124.

The data is then passed from the incoming packet buffers 112, 113 to the Bulk Out endpoints 312, 313 of the corresponding internal USB 3 device 122, 124, via the protocol layer. The operation of each internal USB 3 device 122, 124 is then similar to the operation of the USB MSC specification layer 216 described above in FIG. 5 in relation to a bridge device without an embedded hub 110. In an analogous way to the USB MSC specification layer 216 of FIG. 5, after the Bulk Out endpoint 312, 313 of each internal mass storage device 122, 124 has accepted the incoming USB packets, the data is re-constituted, and sent for further processing in the bridge device 10. Referring back to FIG. 7, the data leaving the Bulk Out endpoints 312, 313 is subsequently processed (for example translated) by the protocol converter (which may be a protocol converting unit) 50 (see FIG. 1). As explained herein, the protocol converter 50 operates to translate the data packets to the respective standard to which the downstream interfaces 52, 54 conform. The protocol converter 50 may translate commands from the SCSI standard to the standard (for example SATA/PATA) to which the downstream interfaces 52, 54 conform. The protocol converter 50 may additionally form the SCSI commands from the USB protocol data packets. Thus, the protocol converter 50 may be said to translate data packets from the USB 3 standard to the respective standard to which the downstream interface 52, 54 to which a particular packet is destined conforms. The protocol converter 50 can determine which of the downstream interfaces 52, 54 a packet is destined for using, for example, information from the Device Address field. In this way, the protocol converter 50 can determine the data storage standard of the downstream interface 52, 54 that a packet is destined for, and thus convert the data packet so as to become in accordance with the correct data storage standard.

As shown in FIG. 7, each internal USB 3 device 122, 124 also has a Bulk In endpoint 314, 315. The Bulk In endpoints 314, 315 are configured to process the data to be sent out from the bridge device 10 to a host device. The operation of the Bulk In endpoints is as described above in relation to FIG. 5. In other words, the Bulk In endpoints 314, 315 take the data for transfer and packetize them for transfer to the host. As shown in FIG. 7, the packetized data is then passed from each Bulk In endpoint 314, 315 to a corresponding outgoing packet buffer 114, 115 in the embedded hub 110. The number of outgoing packet buffers 114, 115 is equal to the number of internal USB 3 devices 122, 124. From the outgoing packet buffers 114, 115, the data is aggregated in a packet aggregator 116, before being sent to the host device via the physical USB 3 interface 21.

The internal USB 3 devices 122, 124 each behave in an identical way as the USB MSC specification layer 216 described with reference to FIG. 5. In the embodiment of FIGS. 1 and 7, however, a FIFO/Queue manager 101 may be configured to maintain separate buffers, queues and/or state machines to process the commands, data and status individually for each internal USB 3 device 122, 124, 126.

Figure 9:
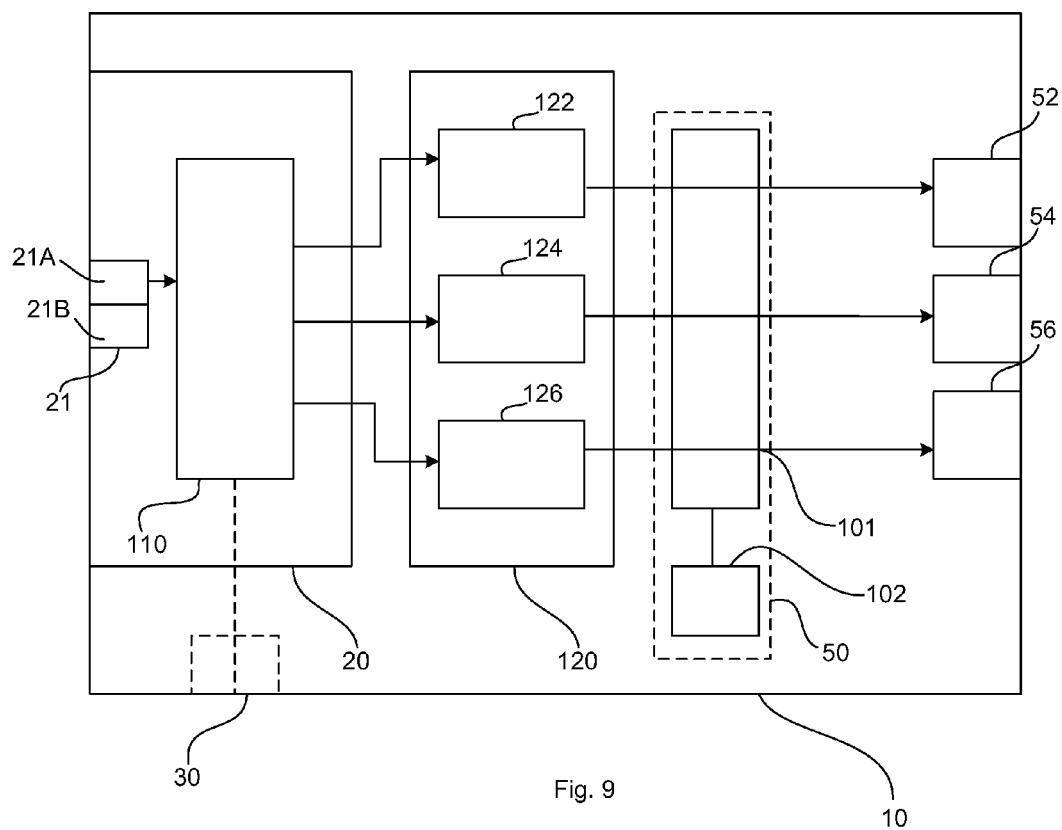
FIG. 9 is a diagram of a bridge device including an embedded hub and internal USB 3 devices, but without the memory controller of FIG. 1.

In an embodiment, each internal USB 3 device 122, 124, 126 may be associated with (for example be in communication with) a single downstream interface 52, 54, 56 for example via the protocol converting unit 50 including the FIFO/QUEUE manager 101 and the processor 102 (which may perform the conversion). In this way, each internal USB 3 device 122, 124, 126 may have a single physical storage device (such as a PATA or SATA device) associated with it. In this case, there would be no requirement to have the RAID/JBOD controllers 103 and/or the DMA Controller 104 shown in FIG. 1 present. Instead, the FIFO/QUEUE manager 101 may be in direct communication with the downstream physical interfaces 52, 54, 56. Such an embodiment is shown in FIG. 9.

Some embodiments, however, may have the same number of internal USB 3 devices 122, 124, 126 and downstream interfaces 52, 54, 56, but also comprise a RAID/JBOD controller 103 and/or the DMA Controller 104. This is the case in the embodiment of FIG. 1 (without the additional downstream interface 58 being present). In this case, the RAID/JBOD controller 103 and/or the DMA Controller 104 can be used to control which storage device(s) data is transferred to/from for each internal USB 3 device. The DMA controller 104 may handle direct transfer of data between the FIFO/QUEUE manager 107 and the downstream interfaces 52, 54, 56, without requiring the processor (which may be an ARM processor) 102. This increases the speed of transfer. However, some data transfer may additionally or alternatively use the processor 102, for example transfers which require protocol conversion or special command processing/handling.

As shown in FIG. 1, each internal USB 3 device may interact with a RAID/JBOD controller 103. Thus, as indicated by the arrows shown in dotted lines in the RAID/JBOD controller 103, each internal USB 3 device 122, 124, 126 may communicate with more than one downstream interface 52, 54, 56, 58.

In an embodiment, each internal USB 3 device 122, 124, 126 may be associated with (for example be in communication with) more than one downstream interface 52, 54, 56, for example via the protocol converting unit 50 including the FIFO/QUEUE manager 101. In this way, each internal USB 3 device 122, 124, 126 may have a more than physical storage device (such as a PATA or SATA device) associated with it. In this case, a RAID/JBOD controller 103 and/or the DMA Controller 104 shown in FIG. 1 would act to handle the handle the transfer of data between each internal USB 3 mass storage device 122, 124, 126 and the associated downstream interfaces 52, 54, 56 as described above in relation to the RAID/JBOD controller of FIG. 6.

It will therefore be appreciated that the number of downstream interfaces 52, 54, 56 (and thus the number of physical storage device (such as a PATA or SATA device) attached to the bridge device 10) may be greater than or equal to the number of internal USB 3 devices 122, 124, 126 in the embedded hub 100. Thus, for example, the three internal USB 3 devices of FIG. 1 could be used to communicate with the four shown downstream interfaces 52, 54, 56, 58, or indeed with more downstream interfaces.

As explained above, according to the USB 3 (for example USB 3.0) specification, a USB 3 interface must also provide a USB 2 physical interface. As such the physical USB 3 interface 21 of the bridge device 10 shown in FIG. 1 has USB 2.0 physical connectors 21B as well as USB 3 physical connectors 21A. In other words, the upstream physical USB interface 21 is capable of operating in USB 2.0 High Speed and Full Speed mode, as well as in USB 3 Superspeed mode. If the physical USB interface 21 of the bridge device 10 connects in USB 2.0 High Speed or Full Speed mode (i.e. the host interface is USB 2.0 High Speed or Full Speed), there is no advantage to operating with multiple internal USB devices because the connection to the host is at the slower 480 Mbps USB 2.0 signaling rate. Thus, when the bridge device 10 is connected to a USB 2 host interface, the embedded hub 110 and the USB 3 core 120 are bypassed. As such, the USB 2 data packets are routed to the protocol converter 50 without passing through the embedded hub 110 and the USB 3 core 120. Of course, the USB 2.0 packets would have to pass through the USB 2.0 link and protocol layers, which are different to the USB 3 link and protocol layers. Thus, USB 2.0 link and protocol layers are provided in such a bypass route for USB 2.0 packets. The operation of the bridge device 10 is then very similar to the operation of the USB 2 bridge device 200 described above in relation to FIG. 6.

In the embodiment of FIG. 1, use of the embedded hub 110, and the internal USB 3 devices 122, 124, 126 means that the bridge device 10 is presented to the host device as multiple discrete USB mass storage devices. As such, it is possible for the host to handle and/or control each internal USB 3 device 122, 124, 126 individually. In turn, this allows the host to handle and/or control the downstream physical storage devices (such as attached SATA or PATA storage devices) individually. This means that the host can be provided with greater flexibility to configure, control, and/or interact with the downstream physical storage disks. Because USB 3 is used to interface between the bridge device 10 and the host device, there is no loss of performance.

Figure 8:
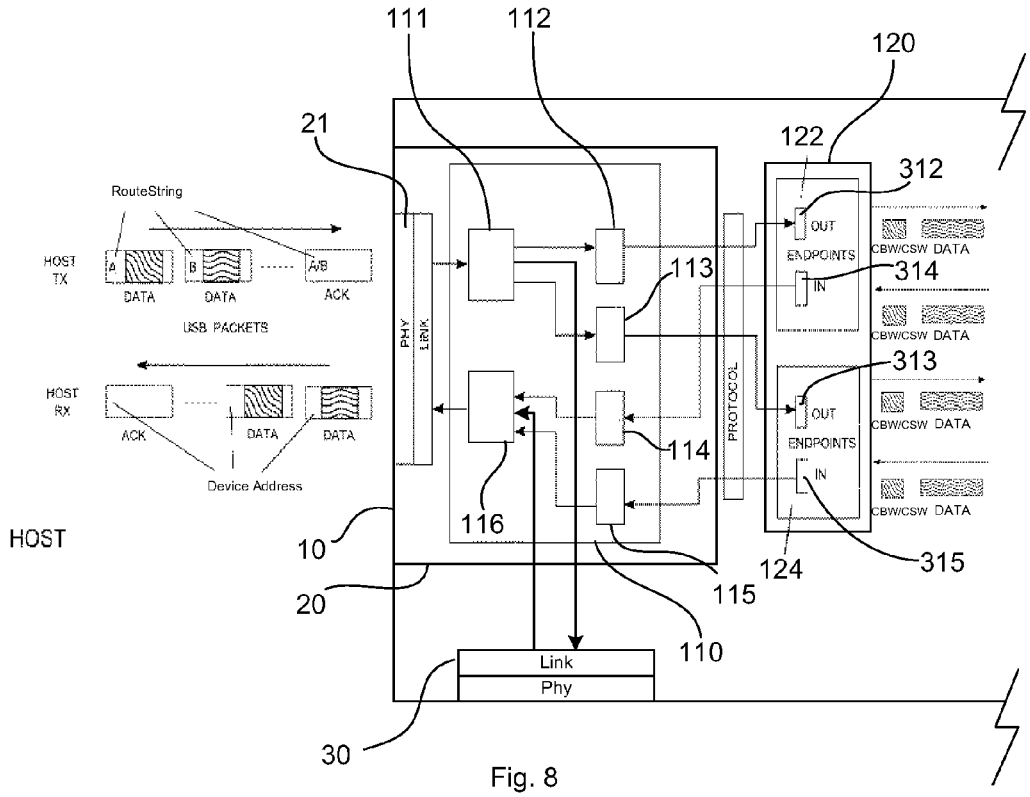
FIG. 8 diagram showing a bridge device with an embedded hub, a USB core having internal USB 3 devices, and a downstream USB 3 interface.

The bridge device 10 may provide a downstream USB 3 (for example USB 3.0) interface in addition to the internal USB 3 devices 122, 124, 126. Such a USB 3 downstream physical interface 30 is shown with dashed lines in FIG. 1. Details of the embedded hub 110, USB core 120, and downstream USB 3 interface 30 for such a configuration are shown in FIG. 8. As can be seen from FIG. 8, the rest of the bridge device 10 may be the same as the bridge device 10 shown in FIG. 1 and in detail in FIG. 7. Thus, the operation of the bridge device 10 having a downstream USB 3 interface 30 of FIG. 8 is substantially the same as the operation of the bridge device 10 described in relation to FIG. 1 and FIG. 7. However, in the case of the bridge device 10 of FIG. 8, the embedded hub 110 is configured to transfer USB 3 data packets to the downstream USB 3 interface 30 in addition to the internal USB 3 devices 122, 124, 126. Again, the routing is based on the RouteString data. The routing process is shown in more detail in FIG. 8. As can be seen from FIG. 8, the physical downstream USB 3 interface 30 has a physical layer (i.e. a physical interface) and a link layer. The operation of the downstream USB 3 interface 30 is thus the same as that of a conventional USB 3 port, as described herein.

In an embodiment including a downstream USB 3 interface 30, there may be just one internal USB 3 mass storage device 122 provided in the USB core 120. In that case, the embedded hub 110 routes the data either to the internal USB 3 device 122 or to the downstream USB 3 interface 30. Alternative embodiments may have more than one internal USB 3 device 122, 124, 126 in addition to the downstream USB 3 interface 30, as is the case with the embodiment shown in FIG. 8 and in FIG. 1. Additionally or alternatively, more than one downstream USB 3 interface 30 may be provided.

Figure 10:
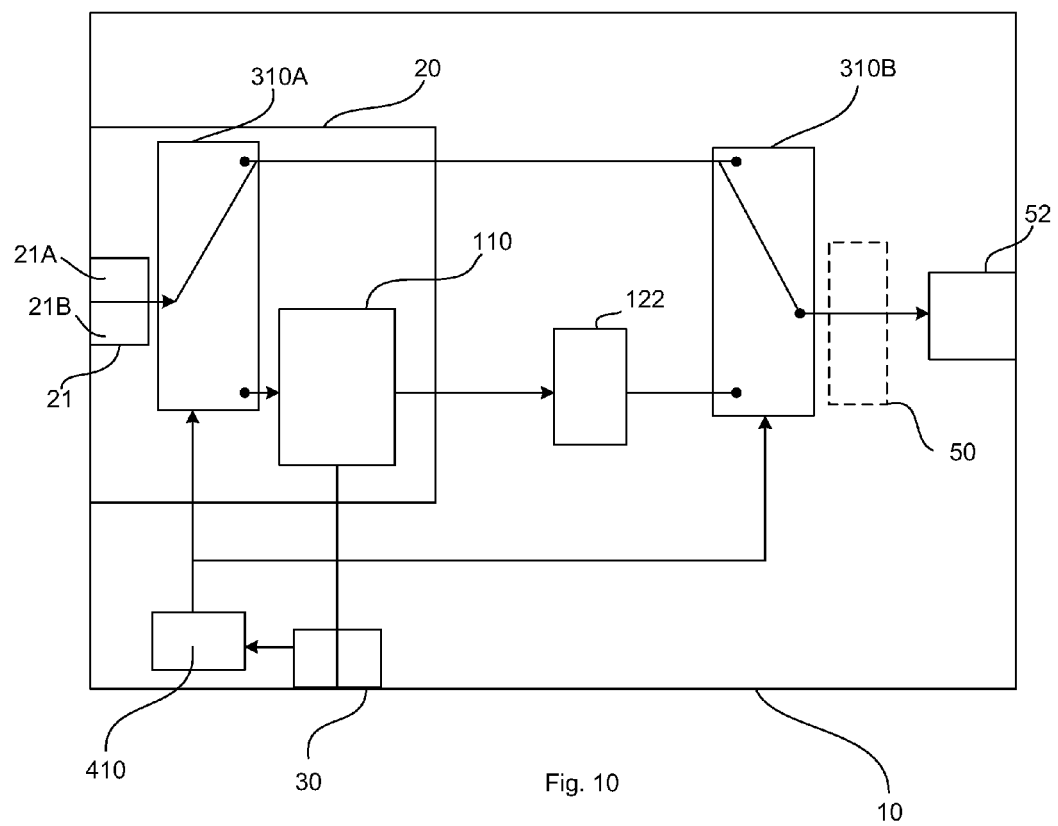
FIG. 10 is a diagram of a bridge device including an embedded hub, an internal USB 3 device, a downstream USB 3 interface, and a switch for bypassing the embedded hub.

An embodiment of the invention may comprise a USB 3 downstream connection circuit 410 configured to detect whether or not the physical downstream USB 3 interface 30 has a downstream device attached, or connected to it. Such a configuration with a downstream connection circuit 410 is shown in FIG. 10. The USB 3 downstream connection circuit 410 may be incorporated into the physical downstream USB 3 interface 30, or may be provided as a separate circuit/device (as shown in FIG. 10).

An embodiment comprising a physical downstream USB 3 downstream connection circuit 410 may also comprise a USB 3 hub bypass circuit 310A/310B. The USB 3 hub bypass circuit 310A/310B is configured such that if the USB 3 downstream connection circuit 410 detects that no downstream device is connected to the physical downstream USB 3 interface 30, then the embedded hub 110 can be bypassed through the USB 3 hub bypass circuit. The USB 3 downstream connection circuit 410 and USB 3 hub bypass circuit 310A/310B would typically be provided to embodiments including only one internal USB 3 device 122 (as in the case in FIG. 10).

Figure 11:
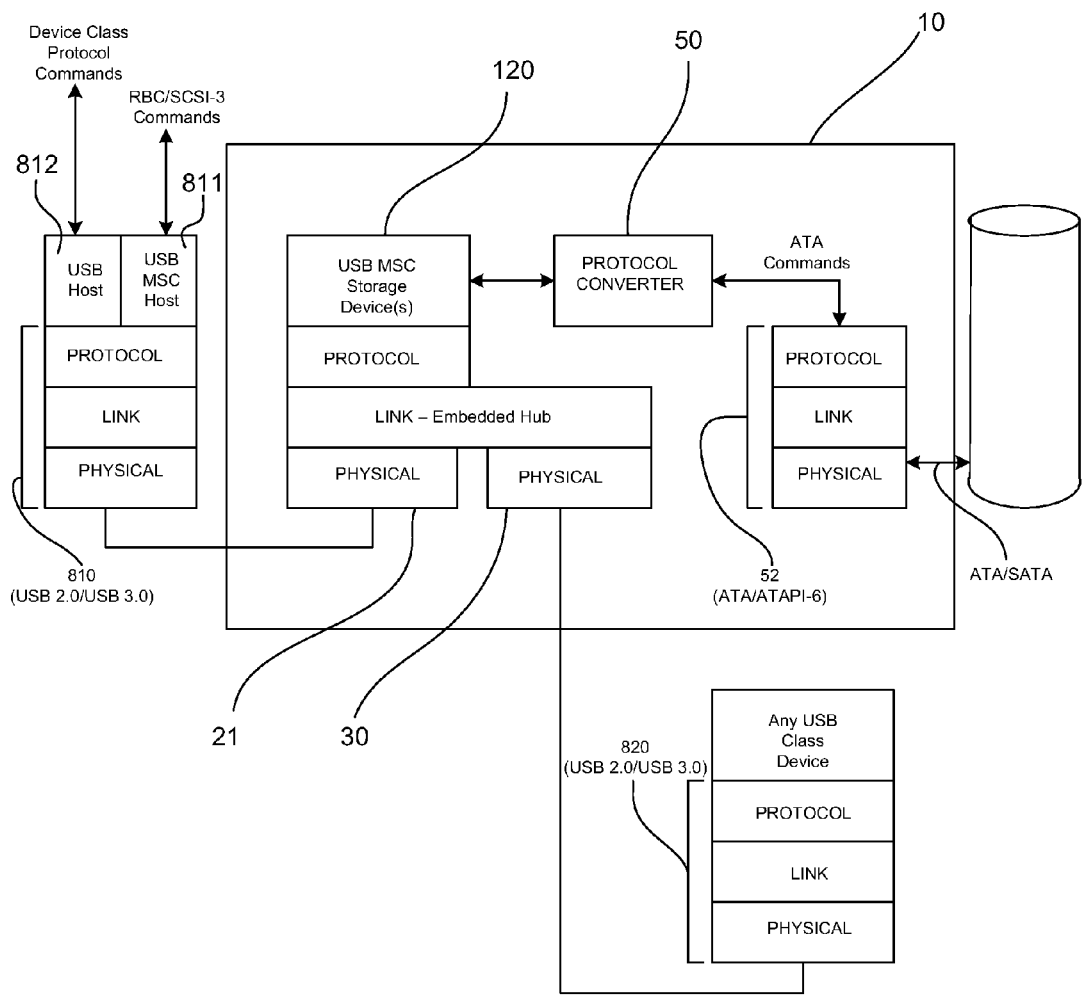
FIG. 11 is a schematic diagram showing the layers for a bridge device with an embedded hub, and a downstream USB 3 interface.

FIG. 11 is a schematic diagram showing how the packets are routed/transferred between the upstream port and downstream ports using the various layers in an embodiment which has a downstream USB 3 interface 30. The various features of the embedded hub 110 for routing/transferring the packets shown in FIG. 8, such as the packet buffers 112, 113, 114, 115 and the packet aggregators 111, 116 are included in the layer labeled "link-embedded hub" in FIG. 11.

As can be seen in FIG. 11, the host 810 that is connectable to the upstream physical USB 3 interface 21 may be a USB 2.0 or a USB 3 host. As such, it may have a protocol, link and physical layer that are in accordance with the USB 2.0 or USB 3 standard. The USB MSC Host component 811 is that part of the host which communicates specifically with the USB MSC Device components in storage peripherals whereas the USB Host component 812 is that part of the host which communicates with any other USB Class device in peripherals.

The bridge device 10 shown in FIG. 11 has features in common with the bridge device 10 shown in FIG. 1 and FIG. 8. Like features are represented with like numerals. As such, the bridge device 10 shown in FIG. 11 includes an upstream physical USB 3 interface 21, one or more downstream interfaces 52 (which may be referred to as further downstream interface(s) 52) that may conform with the ATA/ATAPI-6 standard (only one such downstream interface 52 is shown in FIG. 11, although other embodiments may include more than one downstream physical interface 52), a protocol converter 50, at least one internal USB 3 device provided in a USB core 120, and a physical downstream USB 3 interface 30.

In the FIG. 11 embodiment, the bridge device 10 is arranged such that the physical downstream USB 3 interface may be attached to any USB 3 device(s) not just a USB MSC storage device. In this embodiment, the embedded hub in the bridge 10 acts simply as a router for routing packets between the host (via the upstream physical USB 3 interface 21) and the downstream USB 2.0 or USB 3 device(s) 820 (via the downstream physical USB 3 interface 30). In the particular arrangement shown in FIG. 11, if the downstream physical USB 3 interface 30 were connected to a USB MSC storage device, the embedded hub would be completely unaware of the type of USB device attached. Thus, it could not incorporate any such USB MSC storage device in any RAID/JBOD configuration used to control one or more SATA/PATA devices attached to the further downstream interface(s) 52. As such, in the FIG. 11 embodiment, the data packets passing between the upstream physical USB 3 interface 21 and the downstream physical USB 3 interface 30 need not pass to a higher level than the link layer.

Figure 12:
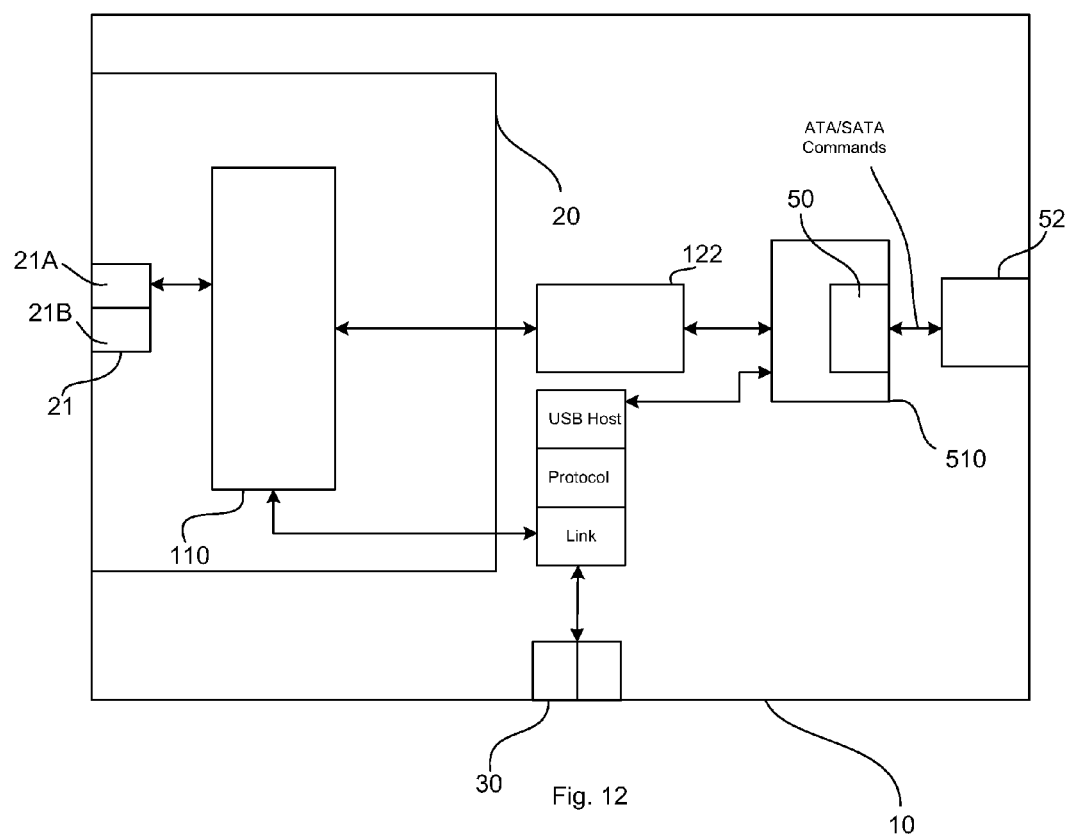
FIG. 12 is a diagram showing a bridge device including an embedded hub, and internal USB 3 device, a downstream USB 3 interface and a memory controller.

FIG. 12 shows an embodiment in which the bridge device 10 includes a memory controller 510, such as a RAID/JBOD controller. In FIG. 12, there is one downstream physical USB 3 interface 30, and one internal USB 3 device 122. However, other embodiments may have more than one internal USB 3 device 122 provided in a USB 3 core 120. The bridge device 10 shown in FIG. 12 has a memory controller 510 which exists outside of the embedded hub 110, between the internal USB 3 device(s) 122 and the downstream interface(s) 52. The memory controller 510 interacts with the downstream physical USB 3 interface 30 via the link, protocol and "USB Host" layers. The downstream physical USB 3 interface 30 may therefore interact with the memory controller 510 using RBC/SCSI-3 commands. The memory controller 510 comprises a protocol converter 50 in the bridge device 10 of FIG. 12. This protocol converter 50 converts commands to the respective format (for example ATA/SATA) for use with the or each further downstream interface 52 as described above. In some embodiments, the protocol converter 50 may be provided separately, and downstream of, the memory controller 510.

Figure 13:
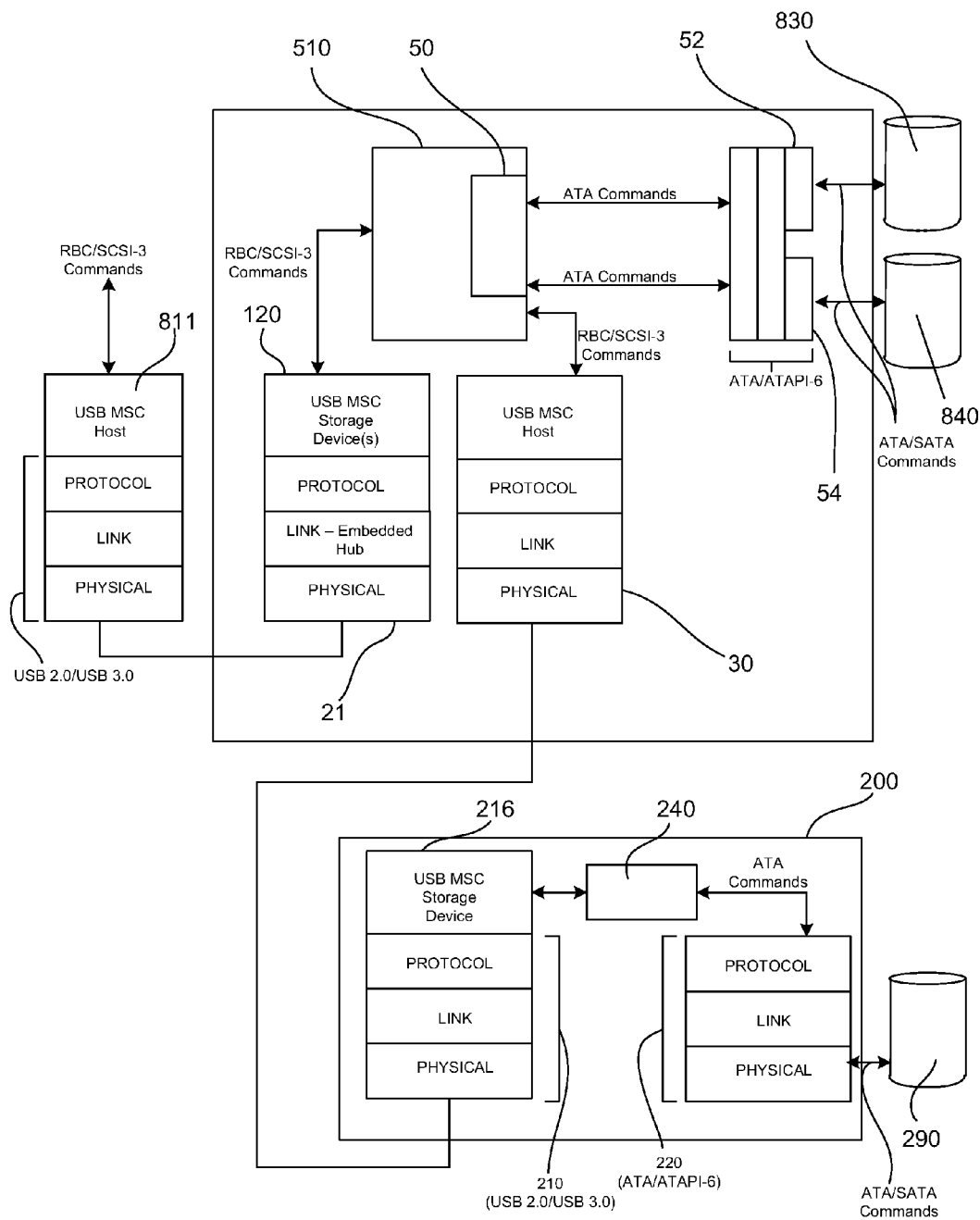
FIG. 13 is a schematic diagram showing the layers in a bridge device including an embedded hub, a memory controller, and a downstream USB 3 interface connected via the memory controller.

The arrangement of the bridge device shown in FIG. 12 allows a USB MSC storage device that is attached to the bridge device 10 via the downstream physical USB 3 interface 30 to be controlled by the memory controller 510. This is different to the arrangement shown in FIG. 11 in which a USB MSC storage device attached to the downstream physical USB 3 interface 30 could not be controlled by a memory controller and thus not included, for example, in any RAID/JBOD configuration. FIG. 13 shows the layers (for example software layers) in an embodiment (such as that of FIG. 12) in which a downstream USB MSC storage device is connected and controlled via a memory controller 510.

In FIG. 13, two downstream SATA devices 830, 840 are attached to the bridge device 10 via the further downstream interfaces 52, 54. Once again, other embodiments may include fewer or more further downstream interfaces 52, 54. The two attached SATA device 830, 840 are being operated through a memory controller 510. Thus they may be operated in a RAID/JBOD configuration. As such, the two attached SATA devices 830, 840 are attached to the USB MSC storage device(s) in the USB core 120 via a RAID/JBOD controller 510. Any other suitable memory controller 510 may alternatively be used. The memory controller 510 includes a protocol converter 50 that produces commands (such as ATA/SATA commands) in the correct format for the downstream attached mass storage devices (which may be SATA devices 830, 840). The protocol converter 50 may be provided separately from (for example downstream of) the memory controller 510, or integrated into the memory controller 510.

In order for any USB MSC storage device attached through the downstream physical USB 3 interface 30 to participate in the same RAID/JBOD configuration as the downstream SATA devices 830, 840, the host must only be presented with (via the embedded hub) the single USB MSC device represented by the RAID/JBOD configuration of the memory controller 510. In this regard, the various features of the embedded hub 110 described above in relation to FIGS. 7 and 8 (including the routing devices 111, 116 and the packet buffers 112, 113, 114, 115) are included in the layer entitled "link-embedded hub". If the downstream USB MSC storage device were connected via the arrangement shown in FIG. 11, on the other hand, then the host would be presented with two completely separate MSC storage devices: one representing the RAID/JBOD SATA pair 830, 840, and the other representing downstream USB MSC storage device 216 attached to the downstream physical USB 3 interface 30.

In the embodiment shown in FIG. 13, host RBC/SCSI commands, encapsulated in the USB MSC protocol, are delivered via the USB MSC storage device(s) in the core to the RAID/JBOD controller 510, which then issues the individual commands to the SATA devices (via the protocol converter 50) and to the downstream USB MSC device(s). The RBC/SCSI-3 commands issued to the USB MSC downstream device 216 may differ from the original RBC-SCSI commands issued by the host, depending on the particular RAID/JBOD configuration. Therefore, the RAID/JBOD controller 510 must implement an independent USB MSC host function to communicate with the downstream USB MSC storage device(s) 216.

In the example shown in FIG. 13, a single SATA device 290 is connected to the downstream physical USB 3 interface 30 via a conventional bridge 200 such as that shown and described in relation to FIG. 2. However, it will be appreciated that any suitable USB MSC storage device could be presented to the downstream physical USB 3 interface 30. For example, another instance of any of the bridge devices 10 described herein (which of course may have more than one SATA device connected thereto, these being configured as individual MSC devices or as a single MSC device via a RAID/JBOD controller) may be connected to the downstream physical USB 3 interface 30. Thus, the downstream physical USB 3 interface 30 may act as a USB MSC host to support the attachment of one or more than one MSC device in exactly the same way as a host interface (for example a PC host) to which the upstream physical USB 3 interface 21 of the bridge device 10 is connected.

Figure 14:
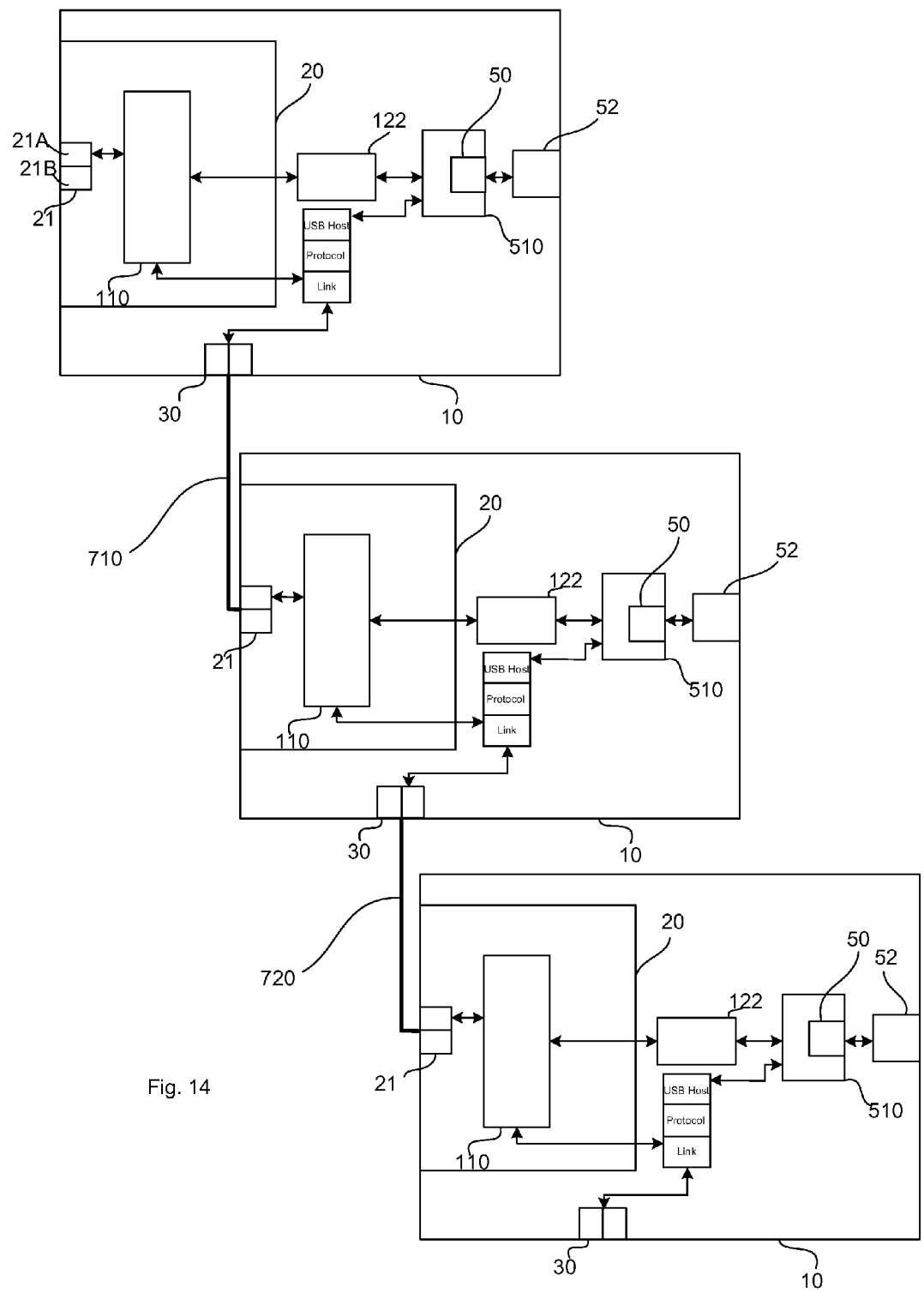
FIG. 14 is a diagram of a cascade of bridge devices.

FIG. 14 shows an arrangement in which a cascade of similar bridge devices 10 are connected together via their upstream 20 and downstream 30 USB 3 interfaces. In FIG. 14, three bridge devices 10 are linked together, shown by link lines 710, 720. In the example shown in FIG. 14, all of the bridge devices 10 have a memory controller 510. Thus, they may all operate in a similar manner to that described above in relation to FIGS. 12 and 13. In other embodiments, it will be appreciated that not all of the bridge devices 10 in the cascade may have a memory controller 510.

It will be appreciated from the discussion of FIGS. 11 and 13, that the arrangement of the layers (in particular the link and protocol layers) of the bridge device 10 including an embedded hub 110 may be configured differently depending on whether the USB device(s) attached to the downstream physical USB 3 interface 30 should appear to the host as separate devices, or whether they are USB MSC storage devices which it is desired should be presented as a single device in combination with any attached downstream storage devices 830, 840 (such as SATA devices) to form a RAID/JBOD storage set.

Figure 15:
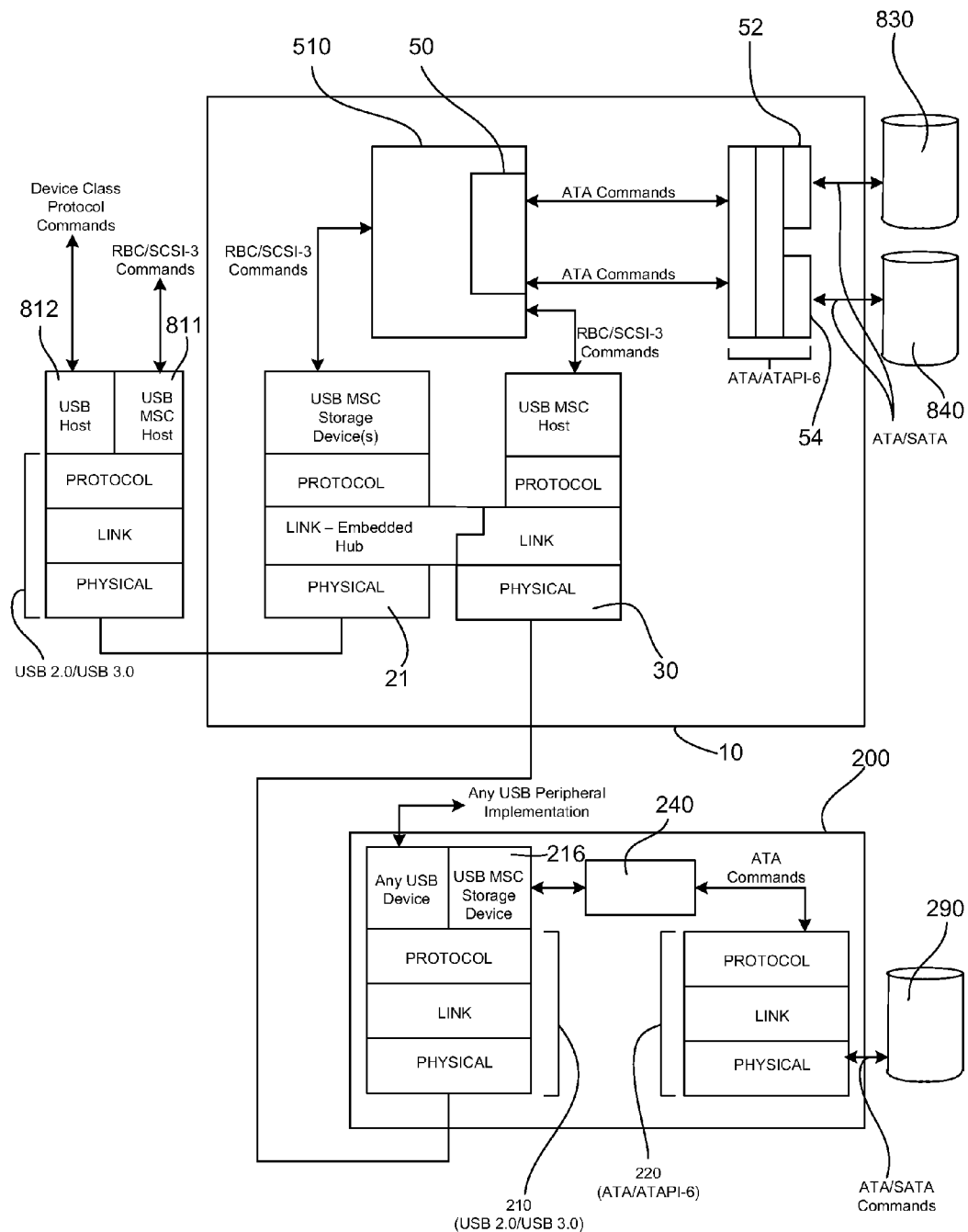
FIG. 15 is a schematic diagram showing the layers in a bridge device having an embedded hub, a memory controller, and a downstream USB 3 interface that may be connected either through the memory controller or not through the memory controller.

As shown in FIG. 15, it is also possible for both arrangements shown in FIGS. 11 and 13 to exist in combination. In FIG. 15, the layers (which may be referred to as software stacks) are arranged such that the link layer for the downstream physical USB 3 interface 30 (i.e. the physical layer) assumes main responsibility for the downstream physical USB 3 interface 30. Upon initial connection of a USB peripheral to the downstream physical USB 3 interface 30, the USB host function in the bridge device 10 may enumerate all of the devices contained within the USB peripheral that has been attached. The decision on which devices should be handled by the memory controller 510 and which should be handled by the host (for example the PC host) directly can be made automatically. For example, such a decision may be based on the assumption that all non-MSC USB storage devices should be handled by the PC, and all USB MSC storage devices should be handled via the memory controller 510. Additionally or alternatively, the arrangement of the software stack shown in FIG. 15 may enable a user to choose whether externally connected storage devices that are connected to the downstream physical USB 3 interface 30 are handled via the memory controller 510 (to take part in a RAID/JBOD storage set for example) or directly by the host PC i.e. to appear as entirely separate storage devices from the storage devices 830, 840 attached to the downstream interfaces 52, 54 of the bridge device 10.

The features of the dependent claims may be used together in any combination.

The invention claimed is:

1. An apparatus comprising:
 a bridge device for connecting a host device to data-storage devices, including:
   an upstream USB 3 interface in accordance with the USB 3 standard for connecting the bridge device to the host device;
   a USB core comprising at least two internal USB 3 devices that are configured to present themselves as separate devices for receipt of data packets in accordance with the USB Mass Storage Class Specification, each data packet comprising a USB 3 header and at least one data packet being in accordance with the SCSI standard;
   an embedded hub configured to route the data packets from the upstream USB 3 interface to respective ones of the internal USB 3 devices;
   at least two downstream interfaces, each downstream interface being in accordance with a respective data storage standard for a databus having a mass storage device connected thereto; and
   a protocol converter configured to convert each of the at least one data packet in accordance with the SCSI standard into a data packet in accordance with the respective data storage standard of the downstream interface to which the data packet is destined, each downstream interface being arranged to receive data packets that are in accordance with its respective data storage standard from at least one of the internal USB 3 devices via the protocol converter.

2. An apparatus according to claim 1, wherein each downstream interface is arranged to receive data packets from a respective internal USB 3 device.

3. An apparatus according to claim 1, wherein the number of downstream interfaces is equal to the number of internal USB 3 devices.

4. An apparatus according to claim 1, wherein
 the number of downstream interfaces is greater than the number of internal USB 3 devices; and
 the bridge device further comprises a memory controller arranged to receive data packets from the internal USB 3 devices and to control storage of the data in the data packets onto data storage devices connected to a set of the downstream interfaces.

5. An apparatus according to claim 4, wherein the memory controller, is a RAID or JBOD memory controller.

6. An apparatus according to claim 1, wherein the protocol converter is configured to support respective data storage standards of the downstream interfaces that include at least two different standards from the group consisting of an ATNATAPI-6 standard; the SCSI standard; and a standard used in flash memory devices.

7. An apparatus according to claim 1, wherein the protocol converter is configured to receive data packets in accordance with the USB Mass Storage Class Specification, and to convert the received packets into the data packets in the SCSI standard, which the protocol converter is configured to convert to the respective data storage standard.

8. An apparatus according to claim 1, wherein the USB core is configured to convert the data packets in accordance with the USB Mass Storage Class Specification to the SCSI standard before the data packets are routed to the protocol converter, and the protocol converter is configured to receive data packets in accordance with the SCSI standard.

9. An apparatus according to claim 1, wherein each downstream interface is in accordance with the same data storage standard.

10. An apparatus according to claim 1, wherein the protocol converter is configured to support at least two different data storage standards.

11. A data storage unit for attachment to the host device, the data storage unit comprising:
   a bridge device according to claim 1; and
   connected to each of the downstream interfaces, a databus in accordance with the respective data storage standard, each databus having a mass storage device connected thereto.

12. A bridge device for connecting a host device to data-storage devices, the bridge device comprising:
   an upstream USB 3 interface in accordance with the USB 3 standard for connecting the bridge device to the host device;
   a USB core comprising at least one internal USB 3 device that is configured to present itself as a device for receipt of data packets in accordance with the USB Mass Storage Class Specification, each data packet comprising a USB 3 header and at least one data packet being in accordance with the SCSI standard;
   a downstream USB 3 interface in accordance with the USB 3 standard for connecting the bridge device to a downstream USB 3 device,
   an embedded hub within the bridge device configured to route the data packets from the upstream USB 3 interface to a particular one of the at least one internal USB 3 device or the downstream USB 3 interface;
   at least one further downstream interface, each further downstream interface being in accordance with a respective data storage standard for a databus having a mass storage device connected thereto; and
   a protocol converter configured to convert the at least one data packet in accordance with the SCSI standard into a data packet in accordance with the respective data storage standard of the further downstream interface to which the data packet is destined, each further downstream interface being arranged to receive data packets that are in accordance with its respective data storage standard from the particular one of the at least one internal USB 3 device via the protocol converter.

13. A bridge device according to claim 12, wherein
the USB core comprises at least two internal USB 3 devices that are configured to present themselves as separate devices for receipt of data packets in accordance with the USB Mass Storage Class Specification,
the bridge device comprises at least two further downstream interfaces, each further downstream interface being in accordance with a respective data storage standard, each further downstream interface being arranged to receive data packets from at least one of the internal USB 3 devices via the protocol converter, and
the embedded hub is configured to route data packets from the upstream USB 3 interface to respective ones of the internal USB 3 devices or the downstream USB 3 interface.

14. A bridge device according to claim 13, wherein each further downstream interface is arranged to receive data packets from a respective internal USB 3 device.

15. A bridge device according to claim 13, wherein the number of further downstream interfaces is equal to the number of internal USB 3 devices.

16. A bridge device according to claim 13, wherein
   the number of further downstream interfaces is greater than the number of internal USB 3 devices; and
   the bridge device further comprises a memory controller arranged to receive data packets from the internal USB 3 devices and to control storage of the data in the data packets onto data storage devices connected to a set of the further downstream interfaces.

17. A bridge device according to claim 16, wherein the memory controller is a RAID or JBOD memory controller.

18. A bridge device according to claim 12, wherein the respective data storage standards of the further downstream interfaces include one or more than one of: an ATA/ATAPI-6 standard; the SCSI standard; and a standard used in flash memory devices.

19. A bridge device according to claim 12 comprising:
   a USB 3 downstream connection circuit configured to detect whether or not a device is connected to the downstream USB 3 interface, and
   a USB 3 hub bypass circuit configured to bypass the embedded hub unit if the USB 3 connection circuit detects that no device is connected to the downstream USB 3 interface.

20. A bridge device according to claim 12, further comprising:
   a memory controller configured to control communication with mass storage devices attached to the bridge device via the downstream USB 3 interface.

21. A bridge device according to claim 20, wherein the memory controller is a RAID or JBOD device.

22. A bridge device according to claim 20, wherein the memory controller is further arranged to receive data packets from each internal USB 3 device and to further control communication with mass storage devices attached to the bridge device via each further downstream interface, each of which is in accordance with a respective data storage standard.

23. A bridge device according to claim 12, wherein the protocol converter is configured to receive data packets in accordance with the USB Mass Storage Class Specification, and to convert the received packets into the data packets in the SCSI standard, which the protocol converter is configured to convert to the respective data storage standard.

24. A bridge device according to claim 12, wherein the USB core is configured to convert the data packets in accordance with the USB Mass Storage Class Specification to the SCSI standard before the data packets are routed to the protocol converter, and the protocol converter is configured to receive data packets in accordance with the SCSI standard.

25. A cascade of bridge devices, each bridge device being in accordance with claim 12, the upstream USB 3 interface of each bridge device that is connected to an upstream bridge device being connected to the downstream USB 3 interface of an immediately upstream bridge device.

26. The cascade of bridge devices according to claim 25, wherein the most upstream bridge device comprises:
   a memory controller configured to control communication with mass storage devices attached to the downstream USB 3 interface of the cascaded bridge devices.

27. A data storage unit for attachment to a host device, the data storage unit comprising:
   a bridge device according to claim 12; and connected to each of the further downstream interfaces, a databus in accordance with the respective data storage standard, each databus having a mass storage device connected thereto.

28. A method of providing data transfer between a USB 3 interface on a host device and multiple downstream devices comprising:
providing a bridge device having:
an upstream USB 3 interface in accordance with the USB 3 standard for connecting the bridge device to the host device;
an embedded hub;
a USB core comprising at least two internal USB 3 devices that are configured to present themselves as separate devices for receipt of data packets in accordance with the USB Mass Storage Class Specification, each data packet comprising a USB 3 header and at least one data packet in accordance with the SCSI standard; and
at least two downstream interfaces, each downstream interface being in accordance with a respective data storage standard for a databus having a mass storage device connected thereto, and arranged to receive data packets from at least one of the internal USB 3 devices;
routing data packets using the embedded hub from the upstream USB 3 interface to respective ones of the internal USB 3 devices; and
transferring data packets from each internal USB 3 device to at least one downstream interface, wherein
the transferring step comprises converting the at least one data packet in accordance with the SCSI standard into a data packet in accordance with the respective data storage standard of the downstream interface to which the data packet is destined.

29. A method of providing data transfer between a USB 3 interface on a host device and multiple downstream devices comprising:
providing a bridge device having:
an upstream USB 3 interface in accordance with the USB 3 standard for connecting the bridge device to the host device;
an embedded hub;
a USB core comprising at least one internal USB 3 device that is configured to present itself as a device for receipt of data packets in accordance with the USB Mass Storage Class Specification, each data packet comprising a USB 3 header and at least one data packet in accordance with the SCSI standard;
a downstream USB 3 interface in accordance with the USB 3 standard; and
at least one further downstream interface, each further downstream interface being in accordance with a respective data storage standard for a databus having a mass storage device connected thereto; routing data packets using the embedded hub from the upstream USB 3 interface to a particular one of the at least one an internal USB 3 device or the downstream USB 3 interface; and
transferring data from each internal USB 3 device to at least one said further downstream interface, wherein
the transferring step comprises converting the at least one data packet in accordance with the SCSI standard into a data packet in accordance with the respective data storage standard of the further downstream interface to which the data packet is destined.

* * * * *